United States Patent
Konda et al.

(10) Patent No.: US 7,639,287 B2
(45) Date of Patent: Dec. 29, 2009

(54) VIDEO IMAGING APPARATUS HAVING NON-LINEAR INPUT-OUTPUT CHARACTERISTIC FOR IMPROVED IMAGE CONTRAST CONTROL

(75) Inventors: Tomoko Konda, Tokyo (JP); Kenichi Fujie, Tokyo (JP); Yoshiyuki Fujii, Tokyo (JP); Hisashi Ishikura, Tokyo (JP); Takayuki Yamamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 753 days.

(21) Appl. No.: 11/050,703

(22) Filed: Feb. 7, 2005

(65) Prior Publication Data

US 2006/0028560 A1    Feb. 9, 2006

(30) Foreign Application Priority Data

Aug. 5, 2004    (JP)    ............... 2004-229835

(51) Int. Cl.
*H04N 9/68* (2006.01)

(52) U.S. Cl. ............... 348/234; 348/148; 348/342

(58) Field of Classification Search ......... 348/234–235, 348/342, 222.1, 118, 148
See application file for complete search history.

(56) References Cited

U.S. PATENT DOCUMENTS

| 5,526,049 | A  | * | 6/1996  | Lee      | ............... 348/354 |
| 7,164,446 | B2 | * | 1/2007  | Konishi  | ............... 348/349 |
| 2003/0081136 | A1 | * | 5/2003  | Kobayashi | ............... 348/333.1 |
| 2003/0103649 | A1 | * | 6/2003  | Shimakage | ............... 382/104 |
| 2004/0175053 | A1 | * | 9/2004  | Kawamata et al. | ............... 382/260 |
| 2005/0285959 | A1 | * | 12/2005 | Nakajima et al. | ............... 348/308 |

FOREIGN PATENT DOCUMENTS

| JP | 10-233966 A   | 9/1998  |
| JP | 2002-312781 A | 10/2002 |

* cited by examiner

*Primary Examiner*—Timothy J Henn
*Assistant Examiner*—Gevell Selby
(74) *Attorney, Agent, or Firm*—Sughrue Mion, PLLC

(57) ABSTRACT

An imaging apparatus of a wide dynamic range can be achieved at low cost while making improvement in contrast and the maintenance or reduction of a circuit size compatible with each other. The apparatus includes a photoelectric conversion part that converts a signal from a light receiving element into a voltage in accordance with an amount of incident light, an analog signal processing part that processes an analog video signal output from the photoelectric conversion part, an A/D conversion part that converts the analog video signal into a digital video signal, and a high frequency emphasis part that emphasizes a high frequency component of the video signal. The high frequency emphasis part suppresses a low frequency component of brightness in the video signal to emphasize the high frequency component, whereby image data of good contrast can be obtained while keeping a dynamic range of the signal.

9 Claims, 23 Drawing Sheets

SIGNAL OF L1

SIGNAL OF L2

SIGNAL OF L3

SIGNAL OF L4

SIGNAL OF L5

VIDEO IMAGING APPARATUS HAVING NON-LINEAR INPUT-OUTPUT CHARACTERISTIC FOR IMPROVED IMAGE CONTRAST CONTROL

BACKGROUND OF THE INVENTION

1. Field of the Invention

The present invention relates to an imaging apparatus installed, for example, on a vehicle, and more particularly, the invention relates to an imaging apparatus having a wide dynamic range that is capable of sensing images without video signals being saturated or painted out to a light side or a dark side even with respect to objects having a light and dark difference with a large dynamic range.

2. Description of the Related Art

In general, in imaging apparatuses, when a light and dark difference exceeds the dynamic range of an image sensor under the condition of an extremely large difference between a high brightness level and a low brightness level of an object, there arises a problem of the white paint-out of a high brightness portion or the black paint-out of a low brightness portion.

With the advent of an imaging apparatus capable of taking picture of an object in the external world with a wide dynamic range, however, it is becoming possible to acquire a video signal that holds intensity or brightness change information without generating either a white paint-out or a black paint-out even under the above situation.

But, when an external world of a wide dynamic range is sensed to provide a video signal by the use of the above-mentioned imaging apparatus, the dynamic range of the video signal itself is limited, so the video image thus obtained can not help but become relatively low in contrast. Particularly, in cases where video signals are used for image processing, there arises another problem that image processing becomes unstable resulting from that an amount of intensity or brightness change or an edge component becomes less prone to be obtained.

In addition, when a wide dynamic range is reproduced by digital values, it is necessary to raise the resolution (the number of bits) of an A/D converter in accordance with the width of the dynamic range, thus giving rise to a further problem that the system becomes large in scale and high in cost.

For instance, assuming that an inexpensive general A/D converter has a resolution of 8 bits or less, an expensive A/D converter has a resolution of 9 bits or more.

Further, when considering that a dynamic range equivalent to the external world is to be reproduced, a similar value is also requested with respect to the S/N ratio of a video signal. Therefore, a very severe noise reduction is required, so there is also a problem that it is necessary to achieve an unrealistic S/N ratio from a design point of view.

Accordingly, an imaging apparatus has been proposed in which by arranging, as a countermeasure for the above-mentioned problems, a gradation correction device that performs gradation correction for signals with small amounts of exposure before synthesizing a plurality of signals with different amounts of exposure output from an image sensor, a satisfactory gradation characteristic can be obtained in high brightness portions of an image after the synthesis thereof by an image synthesis device (see, for instance, a first patent document: Japanese patent application laid-open No. 10-233966 (paragraph [0014])).

Also, another image processing apparatus has been proposed that is provided with an image data conversion device for emphasizing a change in brightness in a plurality of luminance or brightness ranges by using an image data translation table (see, for example, a second patent document: Japanese patent application laid-open No. 2002-312781 (paragraph [0007])).

In the above-mentioned conventional imaging apparatuses, for example in the case of the one described in the first patent document, a high-speed calculation part for performing arithmetic calculations for synthesis in real time is required for each of the gradation correction device and the image synthesis device, and hence there is a problem that the circuit size of the imaging apparatus becomes large.

In addition, in the case of the imaging apparatus described in the second patent document, there are the following problems. That is, a memory is required for holding the output translation table, thus resulting in a large circuit size. Besides, the output translation table has a unique characteristic, so desired video images or contrast can not be obtained with respect to sensed or picked-up scenes that are unable to suit the table characteristic.

SUMMARY OF THE INVENTION

The present invention is intended to solve the problems as referred to above, and has for its object to obtain an imaging apparatus and method which are capable of acquiring desired video images even for objects of wide dynamic ranges (e.g., 60 dB or above) at low cost by making the improvement of contrast thereof and the maintenance or reduction of the circuit size compatible with each other.

Bearing the above object in mind, according to the present invention, there is provided an imaging apparatus having a nonlinear input-output characteristic, and capable of sensing a light and dark difference that is wider than an imaging device having a single linear input-output characteristic over an entire image pick-up range can do. The apparatus includes: a light receiving element that receives incident light from an object to be sensed and generates a light reception signal; a photoelectric conversion part that converts the light reception signal of the light receiving element into an analog video signal of a voltage corresponding to an amount of light of the incident light; an analog signal processing part that processes the analog video signal to create a signal component; an A/D conversion part that converts the signal component into a digital video signal; and a high-pass filter that emphasizes a high frequency component of the analog video signal or the digital video signal.

According to the present invention, it is possible to maintain or reduce the circuit size as well as to improve the contrast of video images at low cost.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Hereinafter, preferred embodiments of the present invention will be described in detail while referring to the accompanying drawings.

Embodiment 1

Figure 1:
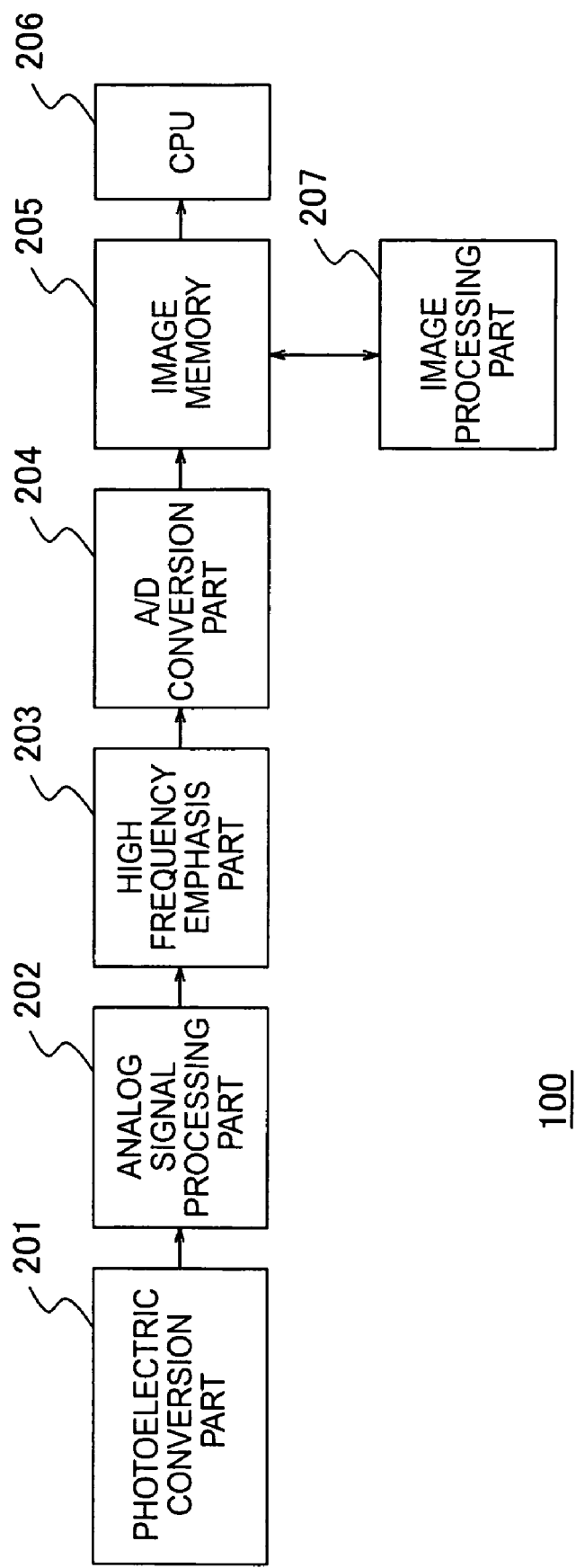
FIG. 1 is a block diagram showing the schematic construction of an imaging apparatus according to a first embodiment of the present invention.
Figure 2:
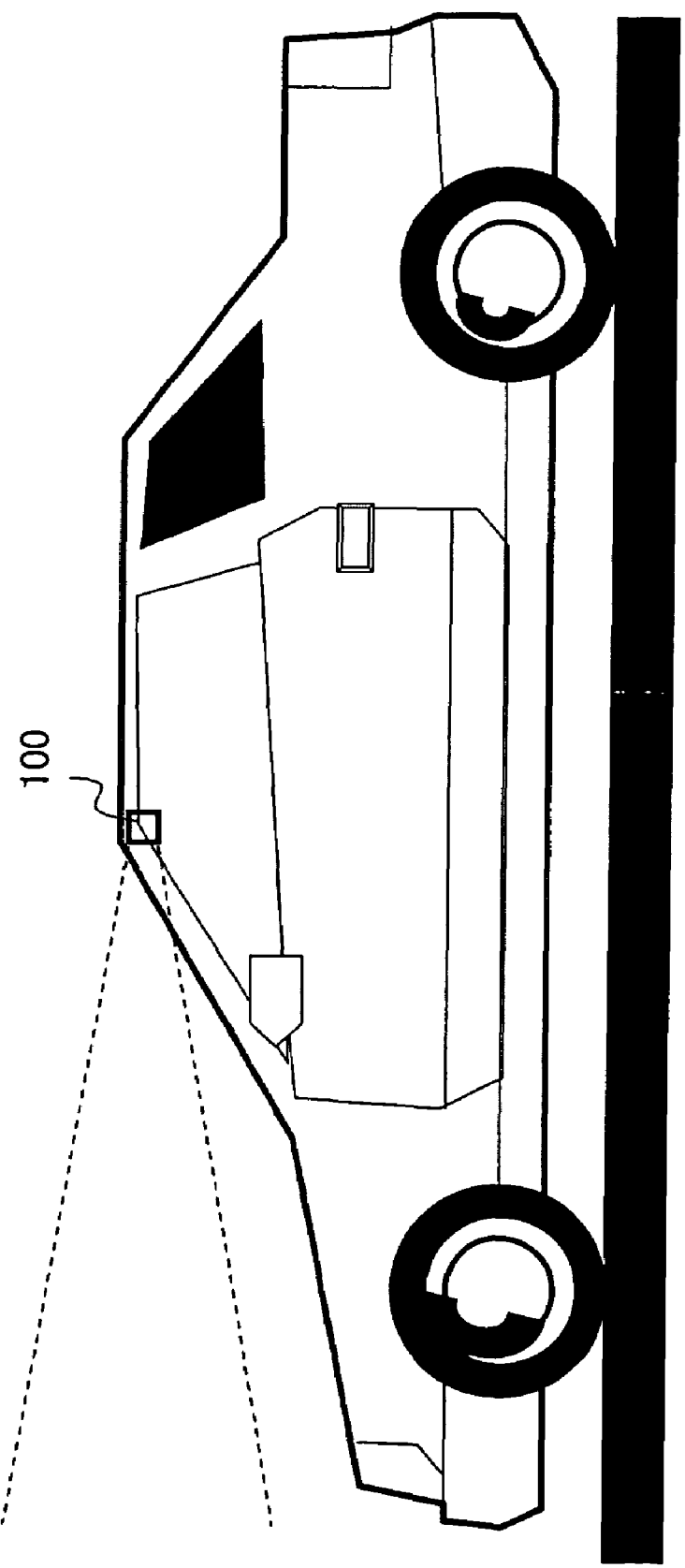
FIG. 2 is an external view showing an installation example in which the imaging apparatus according to the first embodiment of the present invention is installed on a vehicle.
Figure 3:
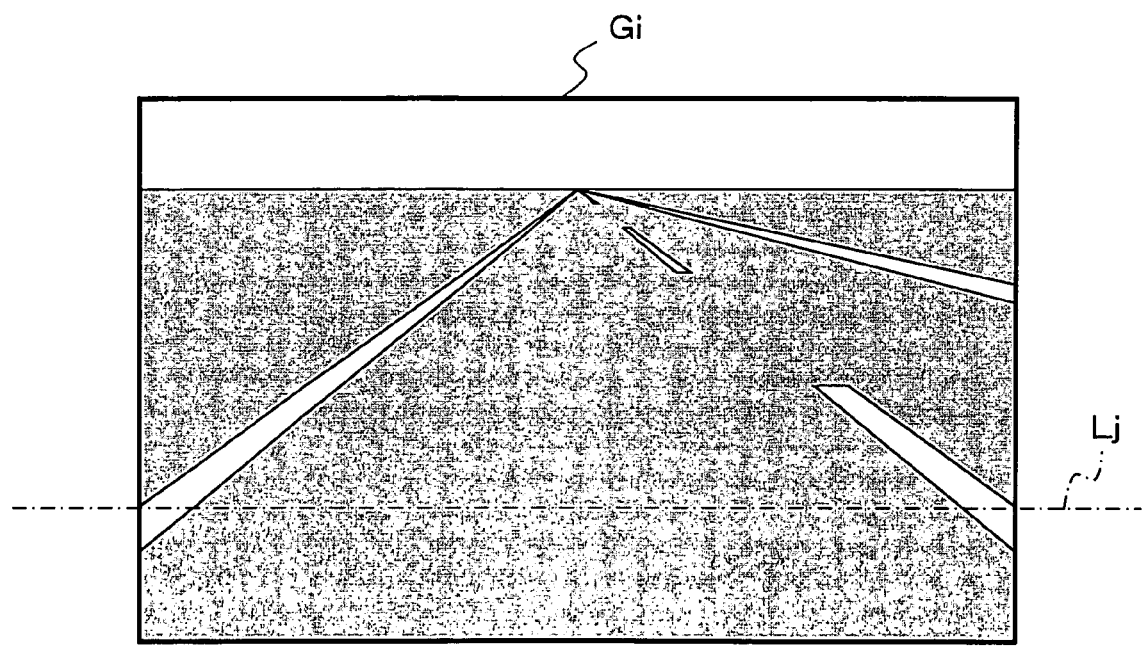
FIG. 3 is an explanatory view showing an example of an image picked up or sensed by the imaging apparatus according to the first embodiment of the present invention.
Figure 5:
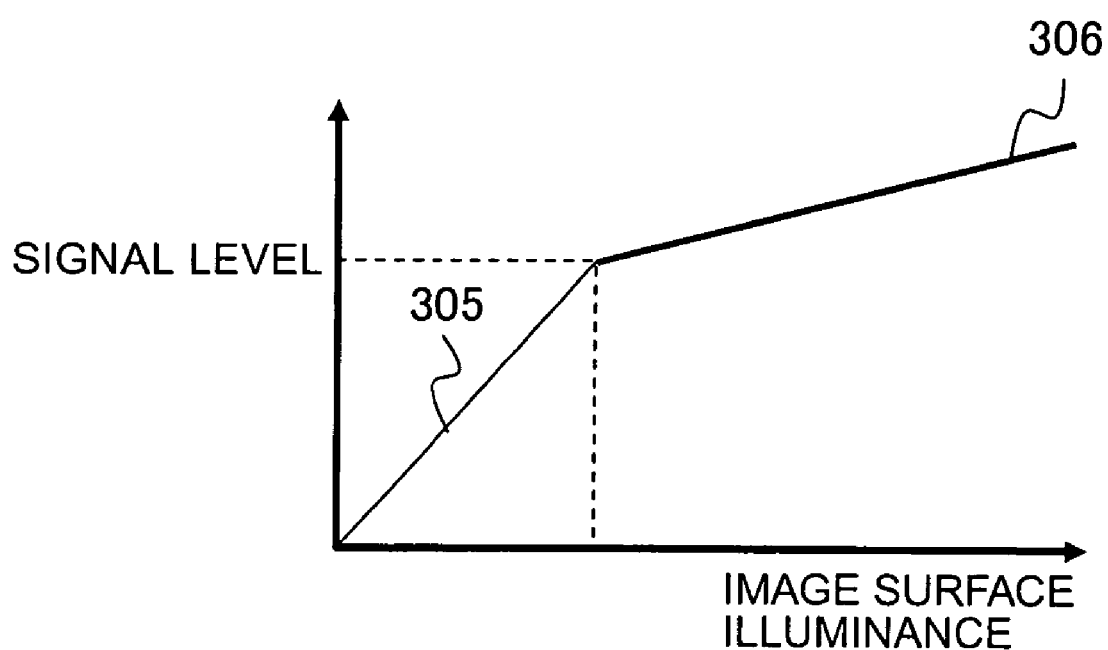
FIG. 5 is an explanatory view showing the relation between the light level of an image surface and the level of a video signal in the first embodiment of the present invention.
Figure 6:
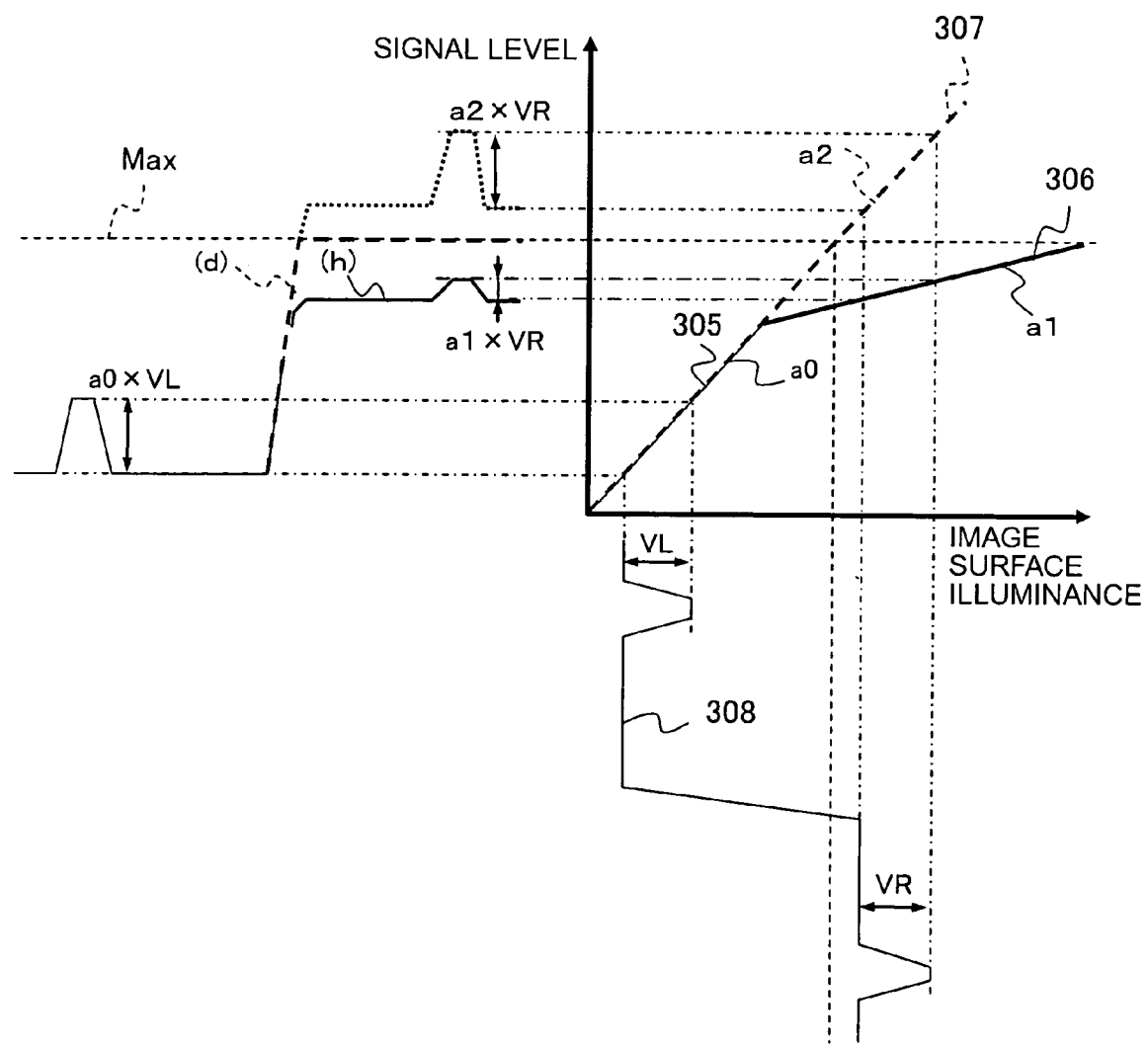
FIG. 6 is an explanatory view showing a linear characteristic and a logarithmic characteristic of the image surface light level and the video signal level in the first embodiment of the present invention.
Figure 7:
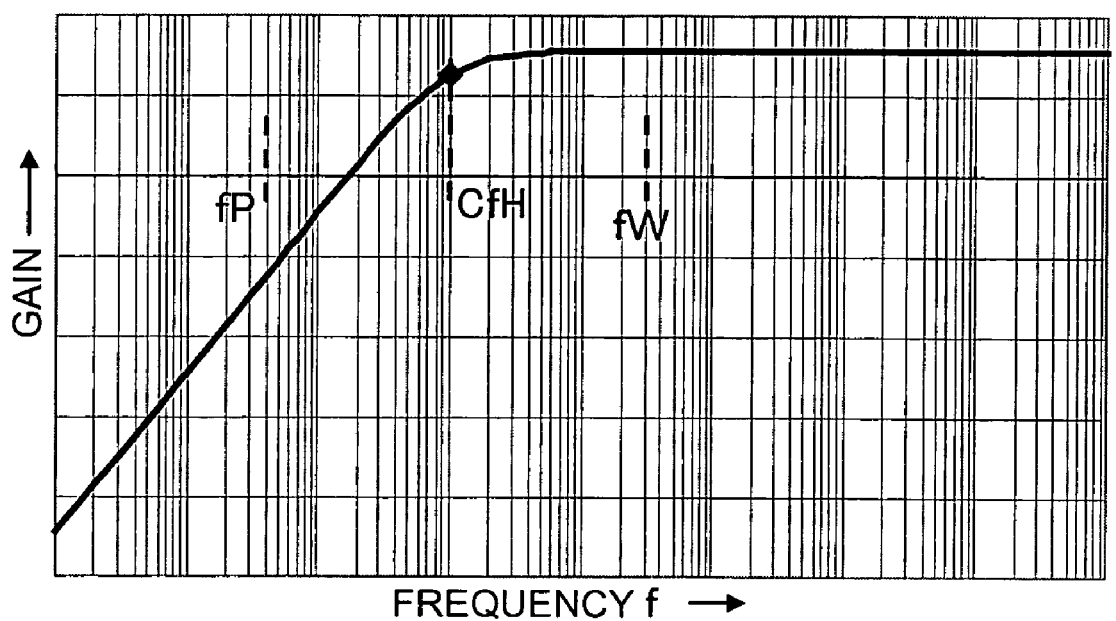
FIG. 7 is an explanatory view showing a frequency characteristic of a high-pass filter according to the first embodiment of the present invention.
Figure 8A:
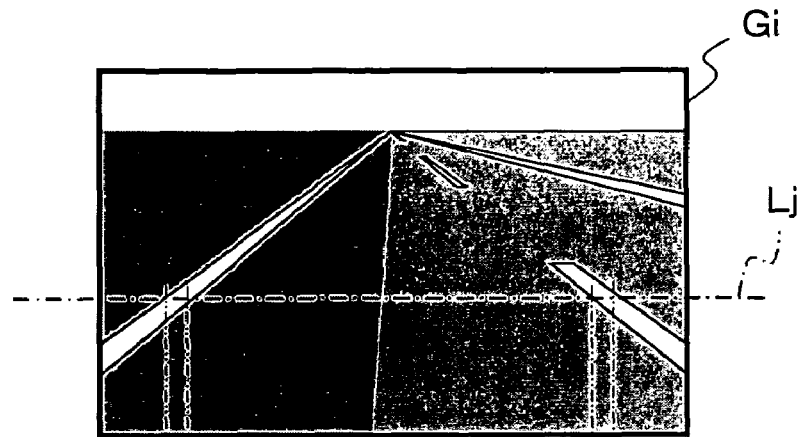
FIGS. 8A, 8B are explanatory views showing a video image and a video signal level, respectively, output by the imaging apparatus according to the first embodiment of the present invention.
Figure 8B:
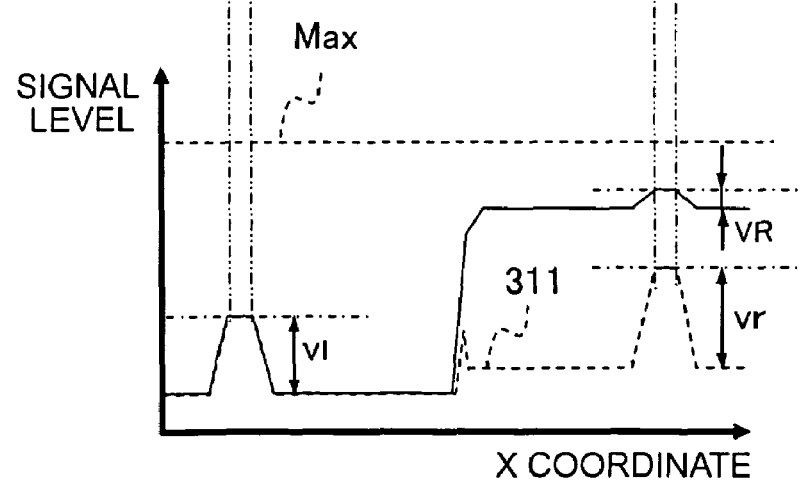

FIG. 1 is a block diagram that shows the schematic construction of an imaging apparatus according to a first embodiment of the present invention. FIG. 2 is an external view that shows an example in which the imaging apparatus shown in FIG. 1 is installed on a vehicle. FIG. 3 is an explanatory view that shows an example of a video image picked up or sensed by the imaging apparatus shown in FIG. 1. FIGS. 4A through 4H are explanatory views that show the relations between a plurality of video image examples and the levels of respective signals picked up or sensed by a generally known imaging apparatus. FIG. 5 is an explanatory view that shows the relation between the light level of an image surface and the level of a video signal applied to the imaging apparatus according to the first embodiment of the present invention. FIG. 6 is an explanatory view that shows the linear characteristic and the logarithmic characteristic of the image surface light level and the video signal level in the imaging apparatus illustrated in FIG. 1. FIG. 7 is an explanatory view that shows the frequency characteristic of a high frequency emphasis part (high-pass filter) according to the first embodiment of the present invention. FIGS. 8A, 8B are explanatory views that show the relation between a video image and the level of a video signal output by the imaging apparatus shown in FIG. 1.

In FIG. 1, the imaging apparatus, generally designated at a reference numeral 100, includes a photoelectric conversion part 201 that constitutes a camera main body, an analog signal processing part 202 that processes an output signal of the photoelectric conversion part 201, a high frequency emphasis part 203 that emphasizes a high frequency component of the output signal of the analog signal processing part 202, an A/D conversion part 204 that converts an output signal of the high frequency emphasis part 203 into a corresponding digital signal, an image memory 205 that stores an output signal of the A/D conversion part 204 as image data, a CPU 206 connected to the image memory 205, and an image processing part 207 that processes the image data in the image memory 205.

Also, the imaging apparatus 100 has a nonlinear input-output characteristic, can pick up or sense a light and dark difference that is wider than that of an imaging apparatus having a single linear input-output characteristic over the entire image pick-up range can do, and can take picture of objects (not shown) having a wide dynamic range.

The photoelectric conversion part 201 includes a light receiving element (not shown) for receiving incident light from an object, and serves to convert a light reception signal of the light receiving element into an analog video signal of a voltage corresponding to an amount of light of the incident light. That is, a luminance or brightness signal from the object is converted into a voltage signal in the photoelectric conversion part 201, and input to the analog signal processing part 202.

The analog signal processing part 202 comprises, for instance, by a CDS circuit, an AGC circuit, a γ correction circuit and the like, and it processes the analog video signal from the photoelectric conversion part 201 and outputs a video signal component thereof thus processed to the high frequency emphasis part 203. The analog video signal processed by the respective circuits in the analog signal processing part 202 is further processed in the high frequency emphasis part 203 in such a manner that a low frequency component thereof is suppressed so as to emphasize or stress only a high frequency component thereof. Subsequently, an output signal of the high frequency emphasis part 203 is input to the A/D conversion part 204 where it is converted into a digital video signal and stored in the image memory 205 as image data. Further, the digital video signal stored in the image memory 205 is subjected to image processing by the CPU 206 and the image processing part 207.

Here, note that though the high frequency emphasis part 203 is arranged at the following stage of the analog signal processing part 202 in FIG. 1, it may actually be arranged at the following stage of the A/D conversion part 204, or it may be arranged at the preceding stage of the analog signal processing part 202. Also, the high frequency emphasis part 203 can be arranged in an arbitrary place as a circuit within the analog signal processing part 202.

Further, the image memory 205 and the image processing part 207 may be included in a functional block within the CPU 206. In addition, as shown in FIG. 2, the imaging apparatus 100 is arranged at a location in a passenger compartment of the vehicle in the vicinity of a rear view check mirror so as to take picture of a forward road image. As a result, the imaging apparatus 100 senses or takes picture of a video image Gi including boundary lines (for example, white lines) on a road surface, as shown in FIG. 3, and the CPU 206 within the imaging apparatus 100 recognizes the white lines thus sensed on the basis of signal levels on each scan line Lj. Specifically, the imaging apparatus 100 includes a white line recognition section that is installed on the vehicle for recognizing white lines on the road surface on which the vehicle is traveling, based on the result of a forward, rear or side view taken from the vehicle. The high-pass cut-off frequency CfH of the high frequency emphasis part (High Pass Filter) 203 (to be described later) is set to a frequency between a spatial frequency fP of the road surface and a spatial frequency fW of each white line.

Now, reference will be made to problems occurring in the output signal levels of general imaging apparatuses while referring to FIGS. 4A through 4H.

FIGS. 4A through 4H are explanatory views illustrating video images and signal levels acquired by the general imaging apparatuses, in which for instance, video images G1-G4 controlled with different contrasts or exposures and signal levels (corresponding to the output signals of the analog signal processing part 202) on scan lines Lj in the respective video images G1-G4 (see alternate long and short dash lines) are shown as corresponding to one another.

Figure 4A:
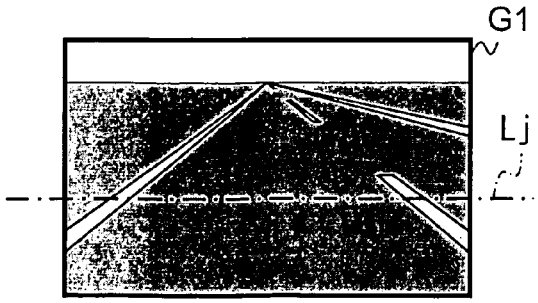
FIGS. 4A through 4H are explanatory views showing examples of images picked up or sensed by a generally known imaging apparatus.
Figure 4B:
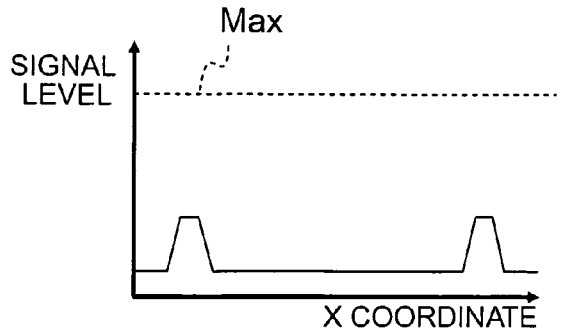
Figure 4C:
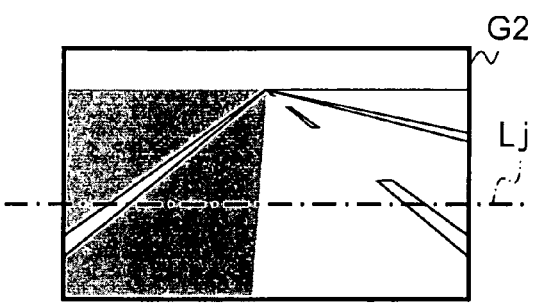
Figure 4D:
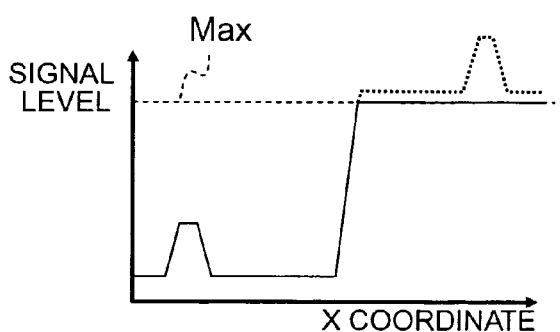
Figure 4E:
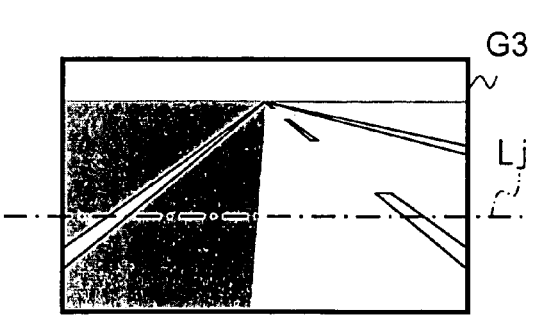
Figure 4F:
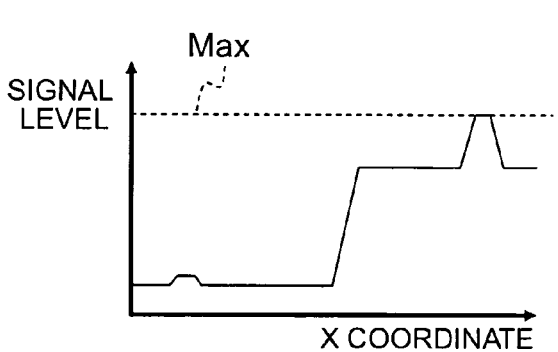
Figure 4G:
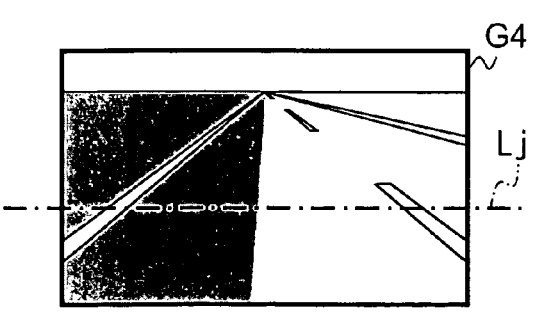

The video image G1 in FIG. 4A shows the case where the light and dark contrast of the road surface is uniform on the whole, and the video images G2-G4 in FIGS. 4C, 4E and 4G, respectively, show the cases where exposure control is performed differently from one another under the condition that the light and dark contrast of the road surface varies on the right and left sides (the right side being brighter than the left side). That is, FIGS. 4A, 4C, 4E and 4G show the video images G1-G4, respectively, and FIGS. 4B, 4D, 4F and 4H show the signal levels on the scan line Lj in the video images G1-G4, respectively.

Figure 4H:
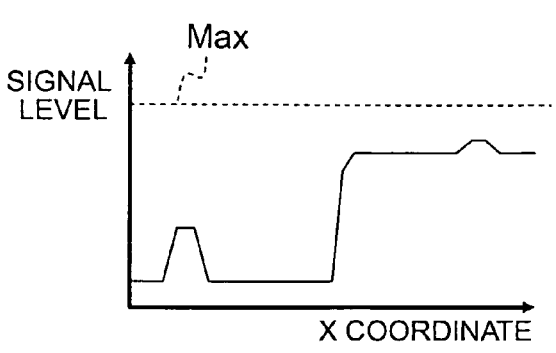

In addition, FIGS. 4C-4F show the video images G2, G3 sensed by and the signal levels output from a general or known imaging apparatus with a narrow dynamic range. FIGS. 4G and 4H show the video image G4 sensed by and the signal level thereof output from a general or known imaging apparatus with a wide dynamic range. In FIGS. 4B, 4D, 4F and 4H, an upper limit Max for analog output signal levels is indicated by broken lines, and a signal level that exceeds the upper limit Max in FIG. 4D (corresponding to the video image G2) becomes an overflow state, as shown in a dotted line.

The video image G1 in FIG. 4A indicates the case where a picture of the road surface is taken in a relatively good manner without the presence of "shaded areas" and "extremely bright areas" on the road surface, whereas the video images G2-G4 in FIGS. 4C, 4E and 4G indicate the cases where a part of the road surface contains a shadow area or an extremely light area, so that the signal level of a white line at the left side is different from the signal level of an inner white line at the right side, with a right side portion of the road surface being lighter than a left side portion thereof.

Here, note that the video images G2, G3 show undesirable examples in which a picture of an object has been taken by means of an image sensor having a linear input-output characteristic, whereas the video image G4 shows a desirable example in which a picture has been taken of the same object as in the case of the video images G2, G3 by means of an image sensor having a nonlinear input-output characteristic.

When a signal for the video image G2 is acquired with the left white line being in a proper contrast, the inner right white line becomes a white void state (i.e., the upper limit Max is exceeded), as shown in FIG. 4D, whereas when a signal for the video image G3 is acquired with the inner right white line being in a proper contrast, the left white line becomes a black paint-out state (i.e., no valid or effective signal level difference is obtained).

On the other hand, with respect to the video image G4 taken by the image sensor of a nonlinear input-output characteristic, signals with valid or effective brightness information can be obtained for both of the right and left white lines without the presence of white voids or black paint-outs.

Here, note that the contrast of the inner right white line becomes lower compared with that of the left white line, as shown in FIG. 4H. Thus, in case where the video image G4 taken by the image sensor of a wide dynamic range is used, for example, for recognition of white lines, a sufficient brightness or luminance difference for the inner right white line might not be obtained with an ordinary resolution of a conventional A/D converter in comparison with the left white line, which is a linear area. In this case, however, using an A/D converter with a high resolution becomes expensive, so high-pass filtering signal processing is generally performed so as to obtain a sufficient brightness difference with the resolution of the conventional A/D converter.

FIGS. 4D and 4F indicate output signal levels when images taken by the general imaging apparatus with a narrow dynamic range are subjected to general processing. That is, FIG. 4D illustrates the case where the contrast of the left white line is controlled so as to provide an appropriate contrast value, and FIG. 4F illustrates, contrary to the case of FIG. 4D, the case where control is effected in a manner as to eliminate white paint-outs of the inner right white line.

FIG. 4H shows a video signal when a picture is taken by using the general imaging device having a wide dynamic range, with its signal level being controlled so as to be acquired within a range not exceeding the upper limit Max. However, note that the general imaging apparatus (the analog signal processing part 202) for acquiring the signal level shown in FIG. 4H has an image sensing characteristic, as shown in FIG. 5. That is, in FIG. 5, the general imaging apparatus with a wide dynamic range includes a linear characteristic part 305 having a linear incident light-output characteristic in case of a low light level, and a logarithmic characteristic part 306 having a logarithmic incident light-output characteristic in case of a high light level.

Although reference is herein made, as an example, to the case where the imaging apparatus 100 with a wide dynamic range has the characteristic of FIG. 5, there are a variety of methods for achieving the wide dynamic range characteristic, and hence the present invention is not limited to the use of the characteristic of FIG. 5 alone.

In the video image G1 illustrated in FIG. 4A, there exists no large brightness difference on the road surface, so it is possible to take picture of both the right and left white lines at high contrast, as shown in FIG. 4B. On the other hand, the video image G2 illustrated in FIG. 4C has the right white line in a white paint-out state, as shown in FIG. 4D, and the video image G3 illustrated in FIG. 4E has the left white line of low contrast (small level difference), as shown in FIG. 4F.

In contrast to this, in the case of using the general imaging apparatus of a wide dynamic range, there is obtained the video image G4 illustrated in FIG. 4G, which has brightness information on the right and left sides of the screen with the contrast of the inner right white line being at a low level, as shown in FIG. 4H.

Next, reference will be made to the signal levels shown in FIG. 4D and FIG. 4H by specifically making a comparison therebetween while referring to FIG. 6.

FIG. 6 illustrates a graph representing the relation between the image surface light level (axis of abscissa) and the video signal level (axis of ordinate), wherein two kinds of relations are shown between an imaging apparatus of a wide dynamic range that includes the linear characteristic part 305 and the logarithmic characteristic part 306 (see solid lines), and an imaging apparatus that includes only a linear characteristic part 307 (see broken lines). The image surface light levels 308 of the road surface and the white lines on the scan line Lj are shown in a lower portion of the graph in FIG. 6, and the signal levels shown in FIGS. 4D and 4H, respectively, are illustrated at the left side of the graph in FIG. 6 by a broken line and a solid line, respectively. In addition, similar to the above, the upper limit Max of the analog output value is indicated by a broken line, and the linear characteristic part 305, the logarithmic characteristic part 306 and the linear characteristic part 307 have straight lines of slopes a0, a1 and a2, respectively. Here, note that the following description will be made with the assumption that the slope a1 of the logarithmic characteristic part 306 is expediently approximated to a straight line, though not so strictly.

In FIG. 6, when the relation between the image surface light level and the video signal level has a linear characteristic (i.e., the linear characteristic part 307), the image surface light level 308 on the scan line Lj is converted into a signal level (d) (see a broken line). On the other hand, when the above relation has a linear characteristic (i.e., the linear characteristic part 305) and a logarithmic characteristic (the logarithmic characteristic part 306), the image surface light level 308 on the scan line Lj is converted into signal level (h) (see the solid line). At this time, the contrast of the left white line lying in the range of the image surface light level of the linear characteristic part 305 is represented, for any of the signal levels (d), (h), by the product ($=a0 \times VL$) of the slope a0 ($=a2$) of the linear characteristic parts 305, 307 and an illuminance difference VL.

On the other hand, the contrast of the inner right white line is represented, for the linear characteristic part 307, by the product ($=a2 \times VR$) of the slope a2 and an illuminance difference VR, and for the logarithmic characteristic part 306, by the product ($=a1 \times VR$) of the slope a1 and the illuminance difference VR. Accordingly, the contrast of the right white line is greatly different between the value ($a2 \times VR$) for the signal level (d)(the logarithmic characteristic part 307) and the value ($a1 \times VR$) for the signal level (h)(the linear characteristic part 306). Therefore, if the analog to digital (A/D) conversion resolution of the logarithmic characteristic part 306 is made identical with that of the linear characteristic part 307 so as to acquire a satisfactory contrast of the inner right white line for the signal level (d), an A/D conversion resolution of "a2/a1" fold is needed. In the case of the linear characteristic part 307, however, the video signal actually becomes a white void state (see the broken line) due to its upper limit Max, and brightness information is lost, so that there is not at all any way that reproduces the image at a later stage.

Hereinafter, reference will be made to the processing operation of the imaging apparatus 100 according to the first embodiment of the present invention illustrated in FIG. 1 with reference to FIG. 7 and FIG. 8 by taking, as an example, the case of the video image G4 and the signal level (d) in FIG. 4G.

In FIG. 1, a video signal from the analog signal processing part 202 is input to the high frequency emphasis part 203, as stated above. The high frequency emphasis part 203 is comprised of a high-pass filter (HPF) that has a high-pass cut-off frequency CfH capable of emphasizing frequencies equal to or above the spatial frequency component fW of the white lines so as to obtain a significant brightness or luminance difference between the road surface and the white lines.

FIG. 7 illustrates one example of the frequency characteristic of the high frequency emphasis part (HPF) 203. In FIG. 7, the high-pass cut-off frequency CfH of the high frequency emphasis part (HPF) 203 is set to an arbitrary frequency between the spatial frequency fP corresponding to the road surface or the like and the spatial frequency fW corresponding to the width of each white line. FIGS. 8A, 8B are explanatory views of the video image G4 and its signal level, respectively, illustrating the result that the processing of the high frequency emphasis part (HPF) 203 having the high-pass cut-off frequency CfH (see FIG. 7) is applied to the signal level waveform (h) shown in FIG. 4 and FIG. 6.

As shown in FIG. 8, the high frequency emphasis part (HPF) 203 suppresses low frequency portions of the video signal, in which the intensity or brightness change of the road surface or the like is gradual or gentle, so as to provide a signal 311 in which only the white lines are emphasized. As a result, it is possible to acquire the left and right white lines both having sufficient contrasts as well as to reduce the levels of peak values in comparison with the case where the filtering processing is not applied. That is, if an A/D converter of a high resolution is needed as previously stated, an increase in the bus width and the provision of a high-performance image processing part or a high-speed CPU or the like would be required, thus resulting in an increased circuit size or scale as well as an increased cost of production. According to the first embodiment of the present invention, however, the right and left white lines both having high contrast can be obtained so that the levels of the peak values can accordingly be reduced. As a result, a white line signal of a satisfactory resolution can be acquired by using the low-resolution A/D converter 204 that is inexpensive.

As described above, according to the first embodiment of the present invention, with the provision of the photoelectric conversion part 201, the analog signal processing part 202, the A/D conversion part 204, and the high frequency emphasis part (HPF) 203 adapted to emphasize the high frequency component of an analog video signal (or digital video signal), it is possible to suppress the dynamic range of a final output signal while maintaining good contrast by suppressing the low frequency component of brightness to emphasize the high frequency component thereof in the high frequency emphasis part 203. As a consequence, an improvement of contrast in the imaging apparatus 100 of a wide dynamic range can be achieved without the need of a large-scale circuit and high cost.

Here, note that the high frequency emphasis part 203 may be constituted by an analog HPF arranged at the preceding stage of the A/D conversion part 204 or by a digital HPF arranged at the following stage of the A/D conversion part 204. In either case, with respect to the video signal before A/D conversion or the digital video signal after A/D conversion, the low frequency component of brightness can be suppressed to emphasize the high frequency component thereof.

Embodiment 2

Although in the above-mentioned first embodiment, no consideration is given to the removal of noise frequencies composed of high frequency component above the signal component to be finally acquired, provision can be further made for a noise rejection or removal part in the form of a low-pass filter.

Hereinafter, reference will be made to an imaging apparatus with the addition of such a noise rejection part according to a second embodiment of the present invention.

Figure 9:
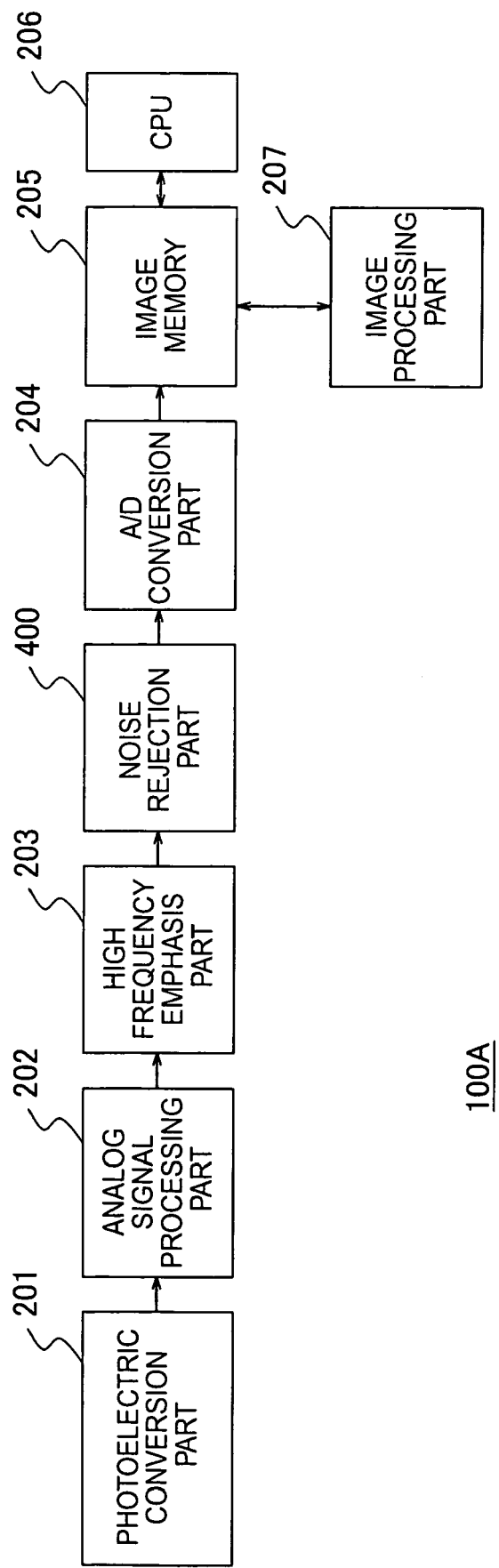
FIG. 9 is a block diagram showing the schematic construction of an imaging apparatus according to a second embodiment of the present invention.
Figure 10:
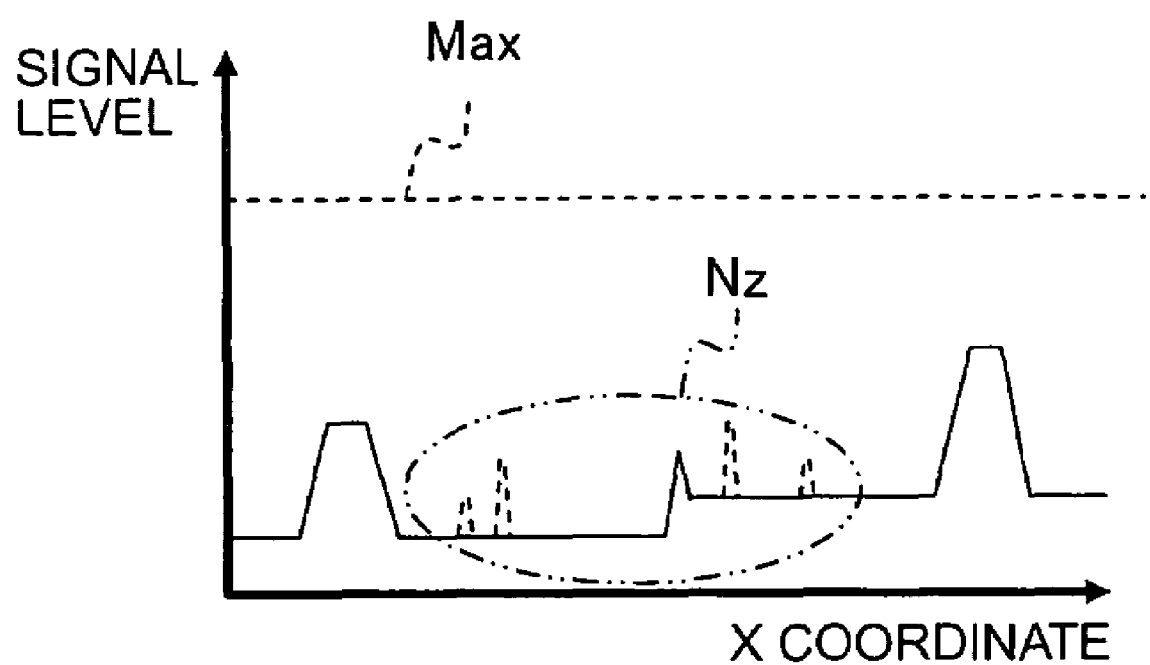
FIG. 10 is an explanatory view showing one example of a video signal containing a noise component in the second embodiment of the present invention.
Figure 11:
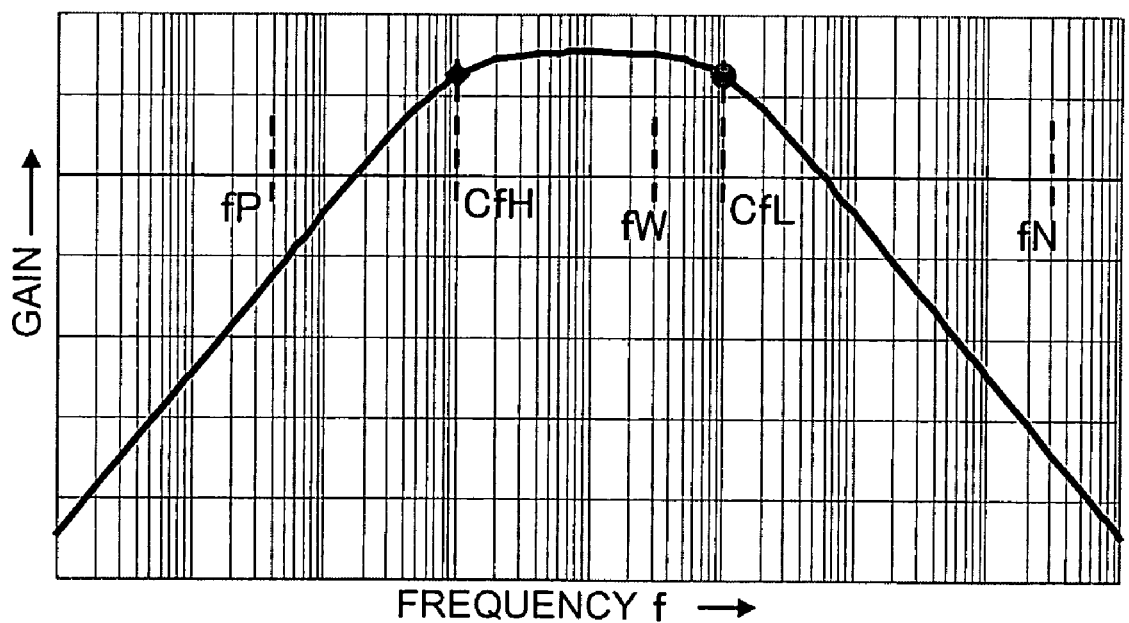
FIG. 11 is an explanatory view showing a frequency characteristic of a band-pass filter according to the second embodiment of the present invention.
Figure 12:
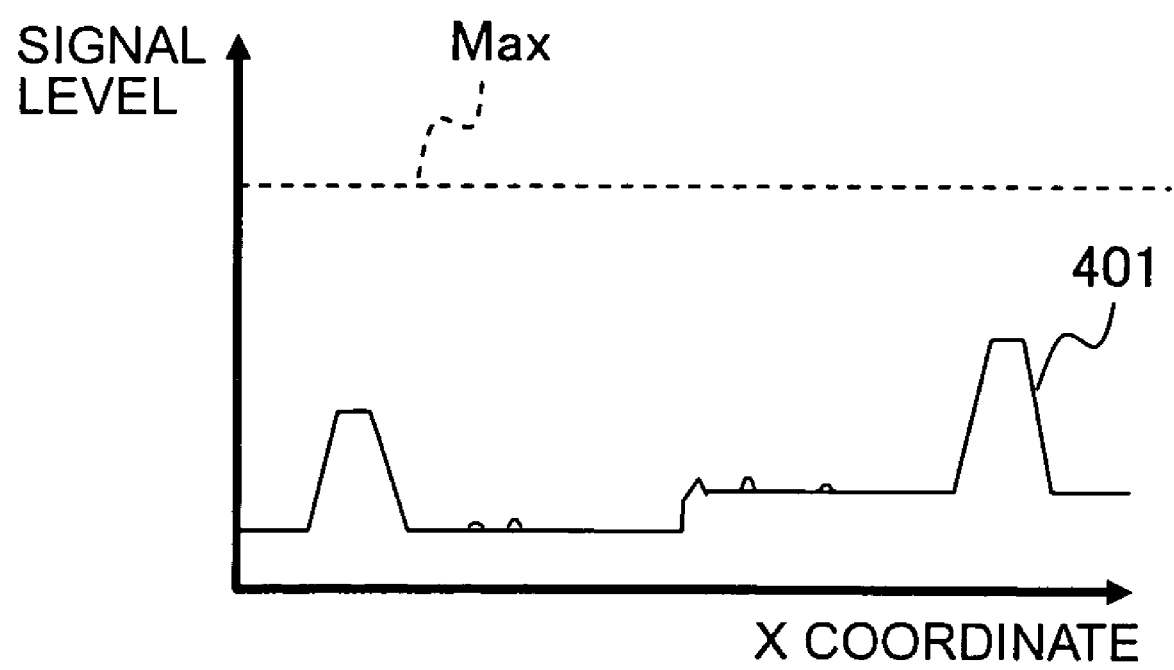
FIG. 12 is an explanatory view showing the level of the video signal output by the imaging apparatus according to the second embodiment of the present invention.

FIG. 9 is a block diagram that shows the schematic construction of the imaging apparatus, generally designated at a reference numeral 100A, according to the second embodiment of the present invention, wherein the parts or components same as those described above (see FIG. 1) are identified by the same symbols or by the same symbols with "A" affixed to their ends, while omitting a detailed explanation thereof. FIG. 10 is an explanatory view that shows one example of a video signal (an output signal of the high frequency emphasis part 203) containing a noise component Nz to be processed or removed in the second embodiment of the present invention. FIG. 11 is an explanatory view that shows the frequency characteristic of a band-pass filter according to the second embodiment of the present invention. FIG. 12 is an explanatory view that shows the level of the video signal after subjected to the filtering processing of the imaging apparatus 100A according to the second embodiment of the present invention. In FIG. 10 and FIG. 12, the axis of abscissa corresponds to the X coordinate of a scan line Lj.

In FIG. 9, a noise rejection part 400 in the form of a low-pass filter LPF) is inserted between the high frequency emphasis part 203 and the AID conversion part 204. Here, note that though the noise rejection part 400 is arranged at the preceding stage of the A/D conversion part 204, it may be arranged at the following stage of the A/D conversion part 204. The noise rejection part 400 is arranged at the preceding or following stage of the A/D conversion part 204 for removing the noise component Nz of high frequencies (i.e., equal to or higher than the low-pass cut-off frequency CfL) contained in the analog video signal or the digital video signal. In addition, the low-pass cut-off frequency CfL of the noise rejection part (LPF) 400 is set to a frequency that is higher than the high-pass cut-off frequency CfH of the high frequency emphasis part (HPF) 203. Accordingly, the high frequency emphasis part (HPF) 203 and the noise rejection part (LPF) 400 together constitute a band-pass filter that serves to pass a frequency band between the high-pass cut-off frequency CfH and the low-pass cut-off frequency CfL.

Next, reference will be made to the operation of this second embodiment of the present invention shown in FIG. 9, while referring to FIGS. 10 through 12.

As stated above, the high frequency emphasis part 203 suppresses the low frequency component of the video signal to create a video signal with the high frequency component thereof emphasized, which is then input to the noise rejection part 400. At this time, the video signal input from the high frequency emphasis part 203 to the noise rejection part 400 is emphasized in its high frequency component, so that not only the white lines on the road surface but also the noise component Nz of high frequencies is emphasized. Thus, the noise rejection part (LPF) 400 removes the noise component Nz of a frequency fN that is higher than the spatial frequency component fW of the white lines on the road surface by using the low-pass cut-off frequency CfL.

FIG. 11 shows the frequency characteristic of the band-pass filter comprising the high frequency emphasis part 203 and the noise rejection part 400. In FIG. 11, the high-pass cut-off frequency CfH is set to a frequency between the spatial frequency fP corresponding to the road surface or the like and the spatial frequency fW corresponding to the width of the white lines (i.e., fP<CfH<fW), as stated previously, so that the spatial frequency fP of the road surface can be removed to emphasize the spatial frequency fW of the white lines. Also, the low-pass cut-off frequency CfL is set to a frequency between the spatial frequency fN of the white lines and the noise frequency fN (fW<CfL<fN), so that the noise component Nz can be removed to emphasize the spatial frequency fN of the white lines. FIG. 12 shows a signal waveform that is obtained by filtering the signal waveform of FIG. 10 with the use of the frequency characteristic of FIG. 11.

Thus, by removing the noise component Nz emphasized by the high frequency emphasis part (HPF) 203 under the action of the noise rejection part 400 newly added, it is possible to suppress the noise component Nz of high frequencies (see FIG. 10), as shown in FIG. 12. As a result, a video signal 401 with only the white lines being emphasized is obtained. That is, it is possible to construct an appropriate band-pass filter corresponding to the spatial frequency of a desired object by making the emphasis of contrast for the white lines and the removal of the noise component Nz compatible with each other.

Embodiment 3

Figure 13:
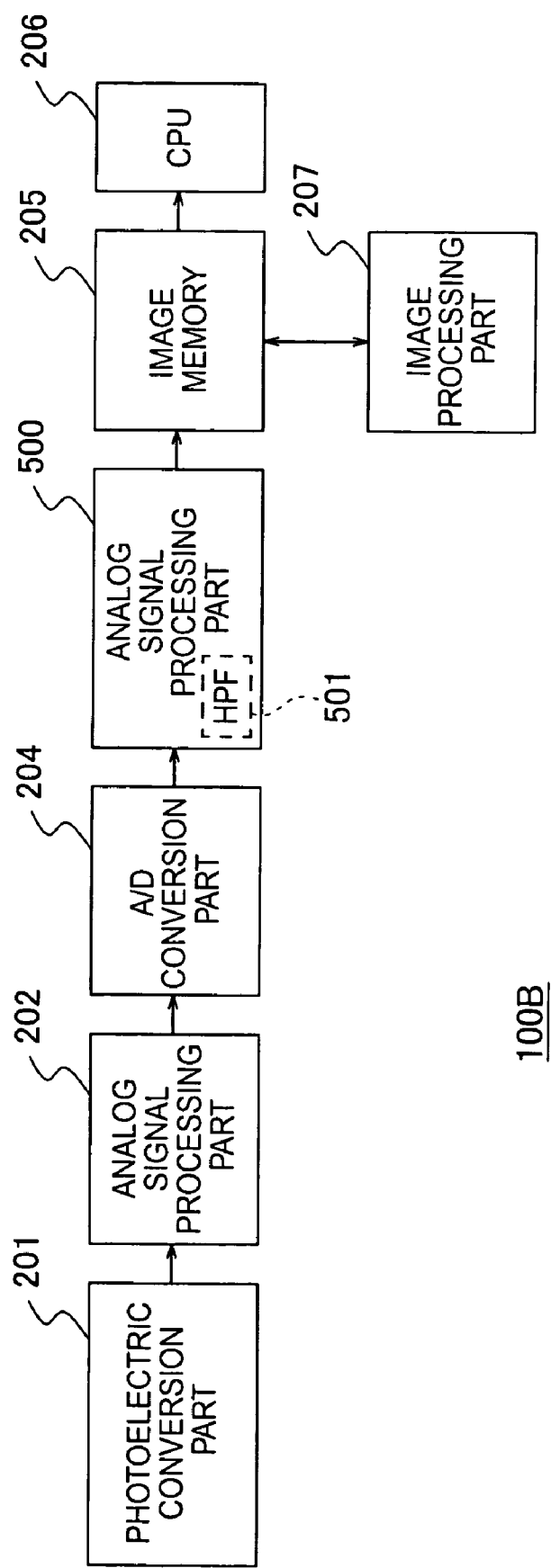
FIG. 13 is a block diagram showing the schematic construction of an imaging apparatus according to a third embodiment of the present invention.

Although in the above-mentioned first embodiment, the high frequency emphasis part 203 is arranged at the preceding stage of the A/D conversion part 204, a digital signal processing part 500 having a function identical to that of the high frequency emphasis part 203 can be arranged at the following stage of the A/D conversion part 204, as shown in FIG. 13.

FIG. 13 is a block diagram that shows the schematic construction of an imaging apparatus 100B according to a third embodiment of the present invention, wherein the parts or components same as those described above (see FIG. 1) are identified by the same symbols or by the same symbols with "B" affixed to their ends, while omitting a detailed explanation thereof.

In FIG. 13, the digital signal processing part 500 having a digital high-pass filter (HPF) 501 is inserted at the following stage of the A/D conversion part 204. In this case, an analog video signal acquired through the photoelectric conversion part 201 and the analog signal processing part 202 is converted into a digital video signal by means of the A/D conversion part 204, and then input to the digital signal processing part 500. The video signal with the white lines being emphasized by the HPF 501 in the digital signal processing part 500 is stored in the image memory 205, and data in the image memory 205 contributes to various processing such as white line recognition, etc., in the CPU 206 and the image processing part 207, similar to the above. Here, note that assuming that the HPF 501 is a one-dimensional digital high-pass filter, the digital signal processing part 500 is arranged at the following stage of the A/D conversion part 204, but may be arranged at the following stage of the image memory 205. In this case, the HPF 501 may be a two-dimensional digital high-pass filter, and the digital video signal after A/D conversion is once held by the image memory 205 and is then subjected to the white line emphasis processing of the digital signal processing part 500.

Figure 14:
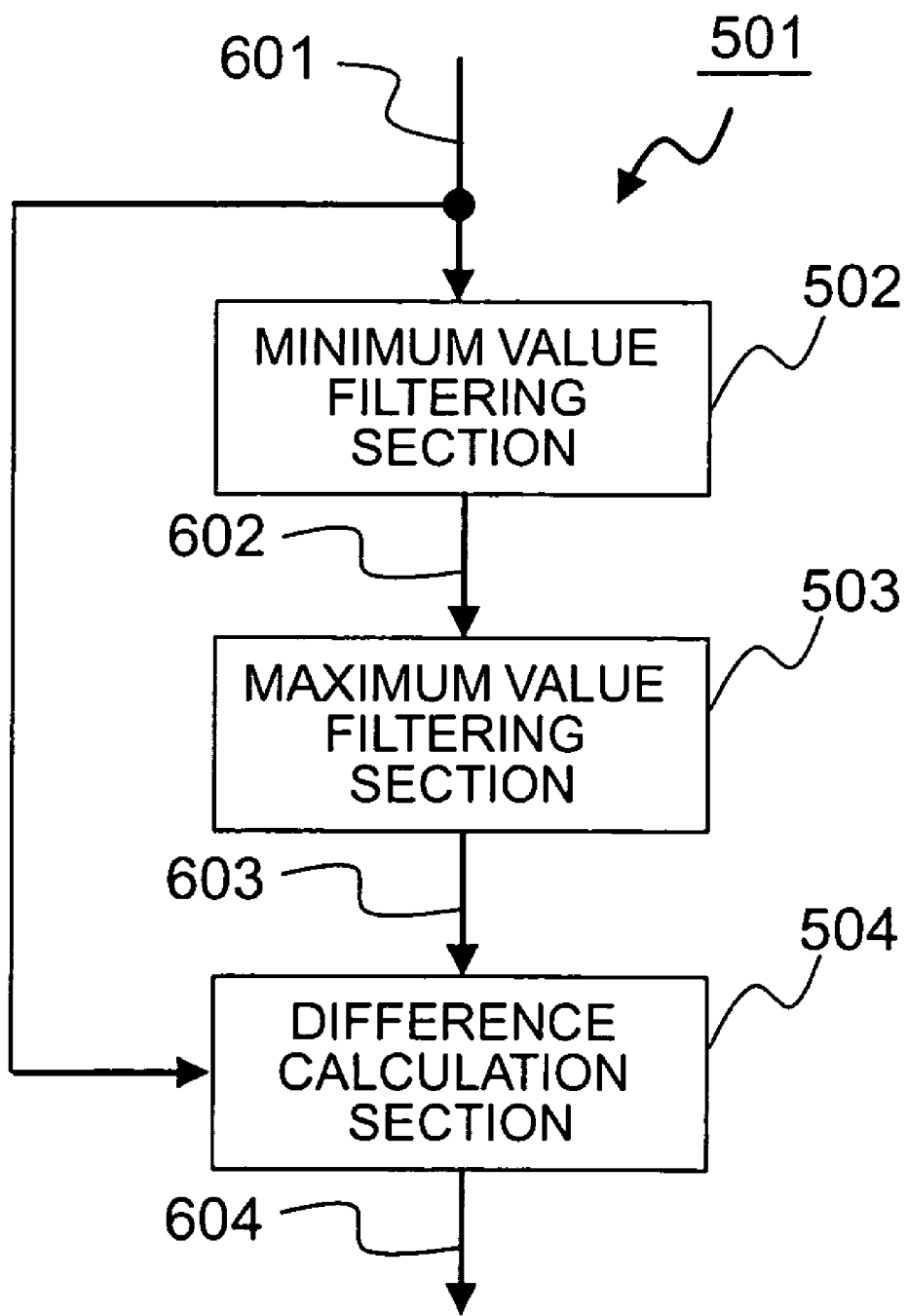
FIG. 14 is a block diagram showing the construction of a digital high-pass filter according to the third embodiment of the present invention.

Hereinafter, detailed reference will be made to the processing operation of the third embodiment of the present invention shown in FIG. 13 while referring to FIG. 14 and FIGS. 15A-15D. FIG. 14 is a block diagram that illustrates the construction of the HPF 501 according to the third embodiment of the present invention, and FIGS. 15A-15D are explanatory views that illustrate a video signal 604 obtained by application of the HPF 501 according to the third embodiment of the present invention.

First, in FIG. 13, the signal processed by the analog signal processing part 202 might become bad in the contrast of a right white line for instance, as stated before (see FIG. 4H), and in this case, a sufficient contrast could not be obtained by using the general low-resolution A/D converter 204.

Here, if an A/D converter of a high resolution (e.g., 10 bits or so) is used without the provision of the digital signal processing part 500, a bus width of 16 bits for example is required for all of the image memory 205, the CPU 206 and the image processing part 207, and besides, a high-performance large-scale image processing part, a high-speed CPU or the like also becomes necessary, resulting in an increased circuit size or scale as well as an increased cost of production.

In contrast, according to the third embodiment of the present invention, by using the HPF 501 of a high-pass cut-off frequency CfH capable of emphasizing frequencies equal to or above the spatial frequency component fW of the white lines, the digital signal processing part 500 can acquire a video signal that, after having been A/D converted into a digital video signal, can be dealt with by 8-bit digital signal processing while holding the gradation of white line portions at the time of A/D conversion (e.g., 10 bits). In addition, the high-pass cut-off frequency CfH of the HPF 501 is set to an arbitrary frequency between the spatial frequency fP corresponding to the road surface or the like and the spatial frequency fW corresponding to the width of the white lines, as shown in FIG. 7. Further, an arbitrary known filter can be used as the HPF 501, but the one constructed as shown in FIG. 14 for instance is used.

FIG. 14 is a block diagram that illustrates a constructional example of the HPF 501, and FIGS. 15A through 15D are explanatory views that illustrate input and output signals 601-604 (one example of arithmetic calculation results) of the respective processing sections in FIG. 14. In FIG. 14, the HPF 501 comprises a minimum value filtering section 502, a maximum value filtering section 503, and a difference calculation section 504.

Figure 15A:
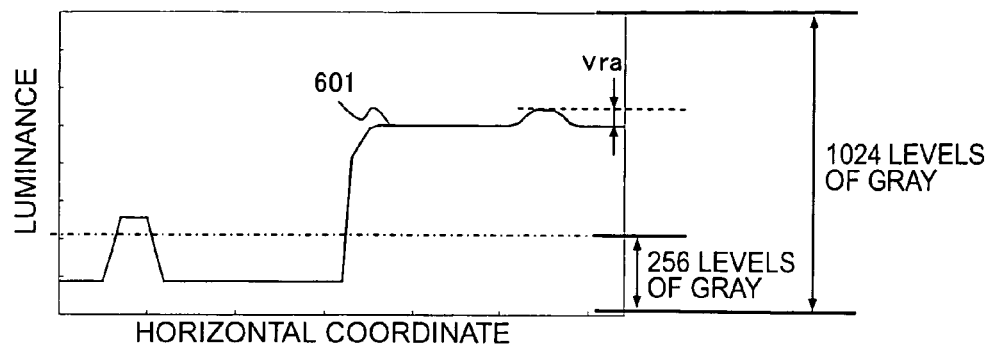
FIGS. 15A through 15D are explanatory views showing the results of application of the digital high-pass filter according to the third embodiment of the present invention.
Figure 15B:
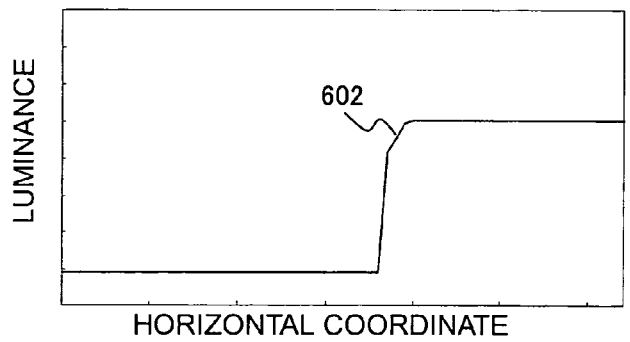
Figure 15C:
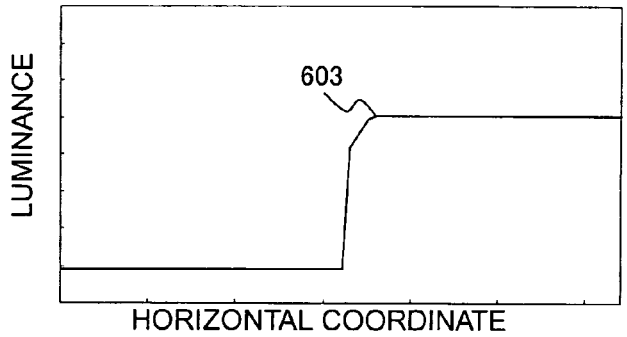
Figure 15D:
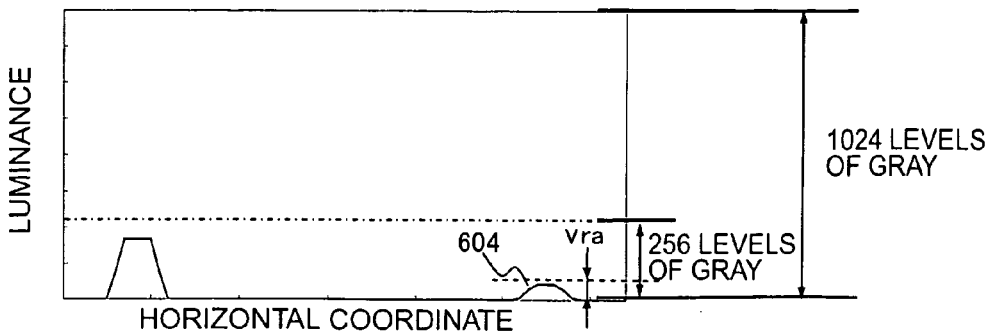

FIG. 15A illustrates an original signal 601 input to the minimum value filtering section 502; FIG. 15B illustrates a post minimum value processing signal 602 output from the minimum value filtering section 502; FIG. 15C illustrates a post maximum value processing signal 603 output from the maximum value filtering section 503; and FIG. 15D illustrates a post difference processing signal 604 output from the difference calculation section 504.

In FIG. 14 and FIGS. 15A-15D, by using a kernel size (i.e., the back-and-forth width of a one-dimensional image filter which makes reference to the neighborhood of a pixel of interest) corresponding to the high-pass cut-off frequency CfH, the minimum value processing section 502 in the HPF 501 performs minimum value filtering processing on the original signal (original image) 601 to create the post minimum value processing signal 602. Subsequently, the maximum value filtering section 503 performs maximum value filtering processing on the post minimum value processing signal (image after subjected to the minimum value processing) 602 by the use of the same kernel size as that used by the minimum value filtering processing, and creates the post maximum value processing signal 603. The post maximum value processing signal (image after subjected to the maximum value processing) 603 thus obtained is the low frequency component of the original signal (original image) 601, and it is assumed to be in the same phase with the original signal (original image) 601.

Accordingly, the difference calculation section 504 takes a difference between the post maximum value processing signal (image after subjected to the maximum value processing) 603 and the original signal (original image) 601, and removes the low frequency component so as to permit only the high frequency component to pass, so that the post difference processing signal (difference image) 604 can be acquired. That is, as shown in FIGS. 15A-15D, the post difference processing signal 604 after subjected to the high-pass filtering processing becomes a signal that can be subjected to signal processing with 256 levels of gray that correspond to 8 bits, while holding a gradation Vra (amount of contrast) of the right white line obtained from the original signal 601 by the 10-bit A/D converter.

As can be seen from the above, in the third embodiment of the present invention, by the provision of the digital signal processing part 500 with the HPF 501, it becomes possible for all the image memory 205, the CPU 206 and the image processing part 207 to perform their processing with the use of a usual 8-bit bus, thus making it unnecessary to use a high-performance image processing part, a high-speed CPU or the like. Accordingly, it is possible to prevent the circuit size from becoming large, so it is also possible to construct the imaging apparatus at low cost as usual.

Embodiment 4

Figure 16:
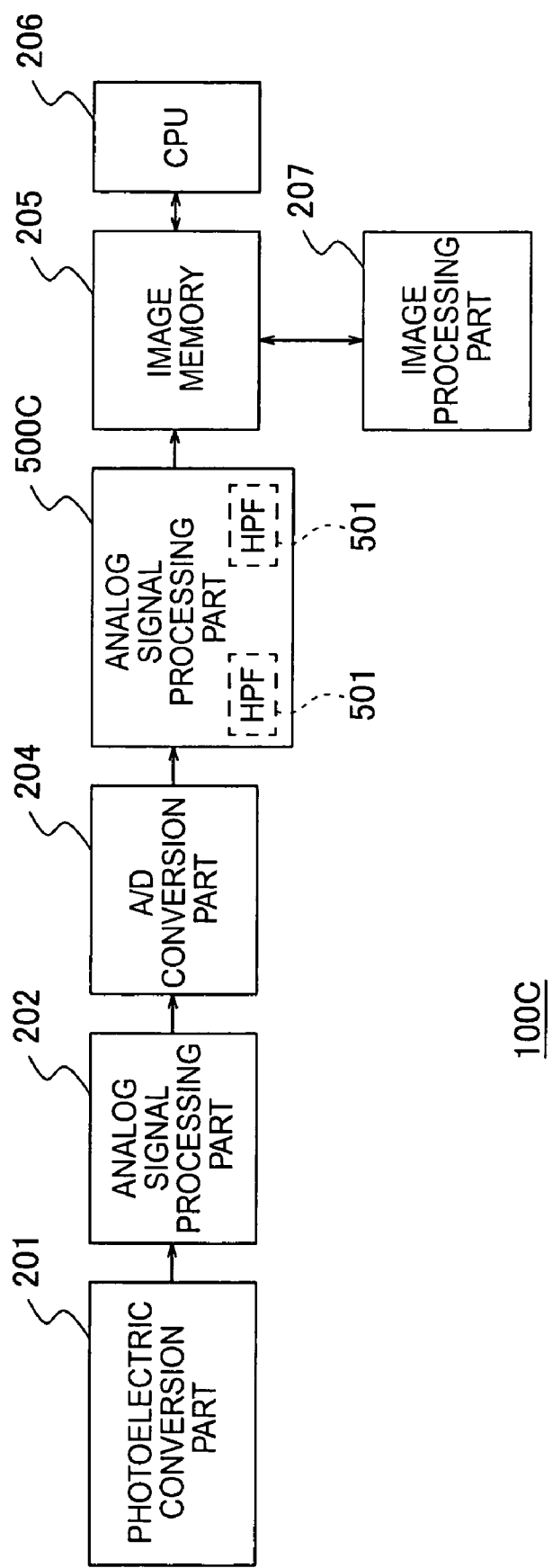
FIG. 16 is a block diagram showing the schematic construction of an imaging apparatus according to a fourth embodiment of the present invention.

Although in the third embodiment, no consideration is given to noise rejection or removal, provision can be made for a noise rejection low-pass filter (LPF) 505 in the digital signal processing part 500, as shown in FIG. 16.

FIG. 16 is a block diagram that illustrates the schematic construction of an imaging apparatus 100C according to a fourth embodiment of the present invention, wherein, the parts or components same as those described above (see FIG. 13) are identified by the same symbols or by the same symbols with "C" affixed to their ends, while omitting a detailed explanation thereof.

In FIG. 16, a digital signal processing part 500C includes the LPF 505 having a function identical to that of the noise rejection part 400 as referred to above (see FIG. 9) for removing a noise component. Here, note that assuming that the LPF 505 in the digital signal processing part 500C is a one-dimensional digital low-pass filter, the digital signal processing part 500C is arranged at the following stage of the A/D conversion part 204, but may be arranged at the following stage of the image memory 205. In this case, the LPF 505 may be a two-dimensional digital low-pass filter, and the digital signal after A/D conversion is once held by the image memory 205 and is then processed by the digital signal processing part 500C.

Figure 17:
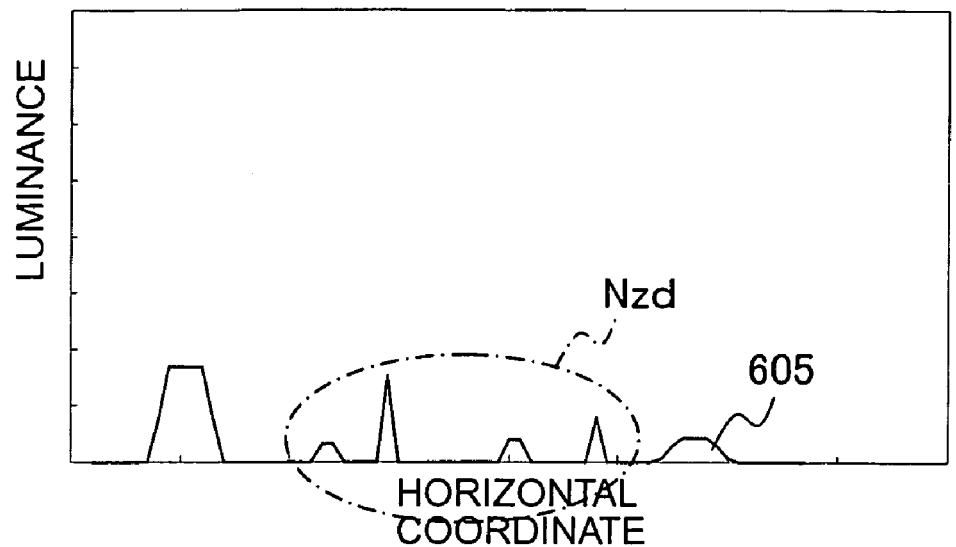
FIG. 17 is an explanatory view showing a video signal before a digital filter is applied thereto according to the fourth embodiment of the present invention.
Figure 18:
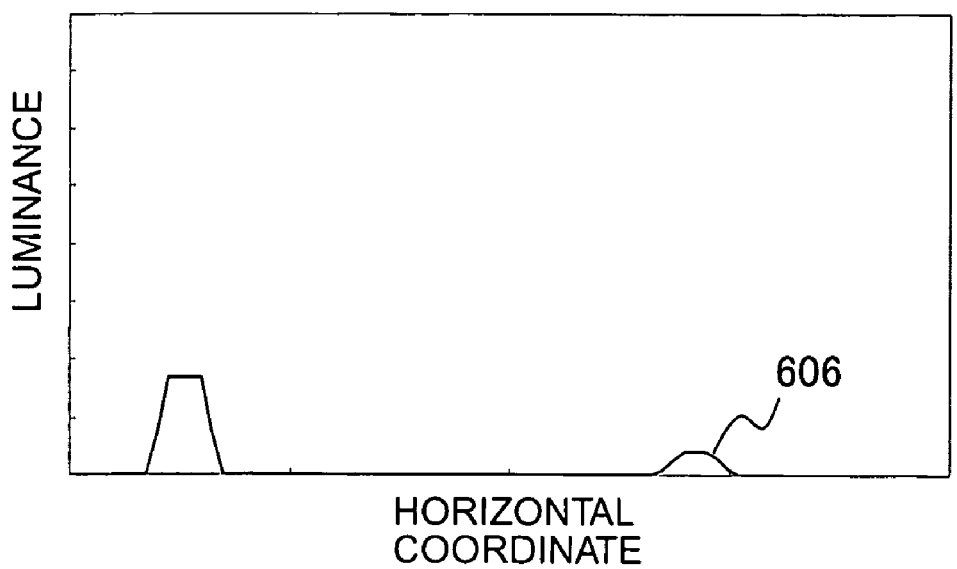
FIG. 18 is an explanatory view showing a video signal after the digital filter is applied thereto according to the fourth embodiment of the present invention.

Hereinafter, detailed reference will be made to the processing operation of the fourth embodiment of the present invention shown in FIG. 16 while referring to FIG. 17 and FIG. 18. FIG. 17 is an explanatory view that illustrates a video signal 605 prior to application of the LPF 505 according to the fourth embodiment of the present invention, and FIG. 18 is an explanatory view that illustrates a video signal 606 obtained by application of the LPF 505 according to the fourth embodiment of the present invention.

First, in FIG. 16, the HPF 501 in the digital signal processing part 500C only passes a high frequency component, and hence not only white lines on a road surface but also a high frequency noise component Nzd remains on a video signal output from the HPF 501. FIG. 17 illustrates one example of such a video signal (digital signal containing the noise component Nzd other than the white lines on the road surface) output from the HPF 501. Accordingly, the LPF 505 in the digital signal processing part 500C performs noise rejection or removal processing on the digital video signal (the low frequency component being suppressed to emphasize the high frequency component) output from the HPF 501. At this time, the LPF 505 has a low-pass cut-off frequency CfL that can remove the noise component Nzd of a frequency fN sufficiently higher than the spatial frequency component fW of the white lines on the road surface.

Here, note that the low-pass cut-off frequency CfL is set to an arbitrary frequency between the spatial frequency fW corresponding to the width of the white lines and the frequency fN corresponding to the noise component Nzd, as referred to above (see FIG. 11). In addition, though an arbitrary known filter can be used as the LPF 505, a median filter is used here.

FIG. 17 illustrates the digital video signal 605 from the HPF 501 in the digital signal processing part 500C, showing a state in which not only the white lines on the road surface but also the noise component Nzd is emphasized at the same time. On the other hand, FIG. 18 illustrates the video signal 606 after median filtering processing of the LPF 505, from which it can be understood that the high frequency noise component Nzd is suppressed and only the white lines are emphasized.

Embodiment 5

Figure 19:
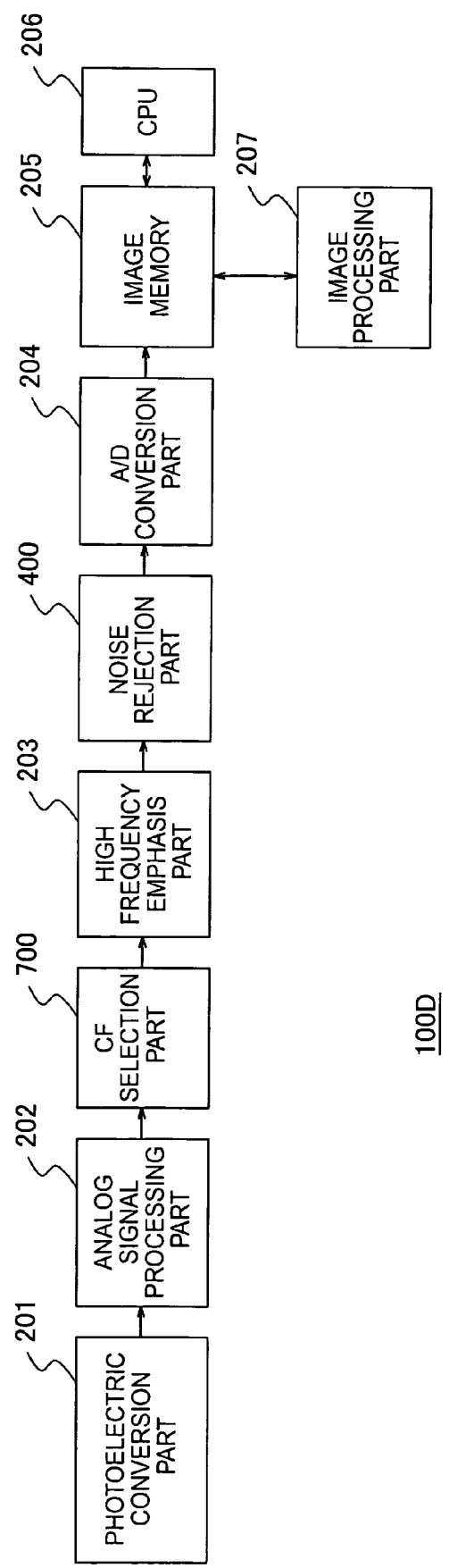
FIG. 19 is a block diagram showing the schematic construction of an imaging apparatus according to a fifth embodiment of the present invention.

Although in the above-mentioned first through fourth embodiments, no consideration is given to a variable setting of the high-pass cut-off frequency CfH, provision can be made for a CF selection part 700 for selecting the high-pass cut-off frequency CfH in accordance with the position of a scan line, as shown in FIG. 19.

FIG. 19 is a block diagram that illustrates the schematic construction of an imaging apparatus 100D according to a fifth embodiment of the present invention, wherein the parts or components same as those described above (see FIG. 9) are identified by the same symbols or by the same symbols with "D" affixed to their ends, while omitting a detailed explanation thereof.

In FIG. 19, the CF selection part 700 is arranged at the preceding stage of the high frequency emphasis part 203, and serves as a high-pass cut-off frequency selection section to select the high-pass cut-off frequency CfH in accordance with the scan line position of a video signal. Specifically, the CF selection part 700 changes the high-pass cut-off frequency CfH at intervals of arbitrary scanning lines. By switching the high-pass cut-off frequency CfH in the CF selection part 700 in accordance with the spatial frequency of an object that is changing for each scan line as shown in FIG. 19, a desired video image can be obtained over the entire screen.

Figure 20:
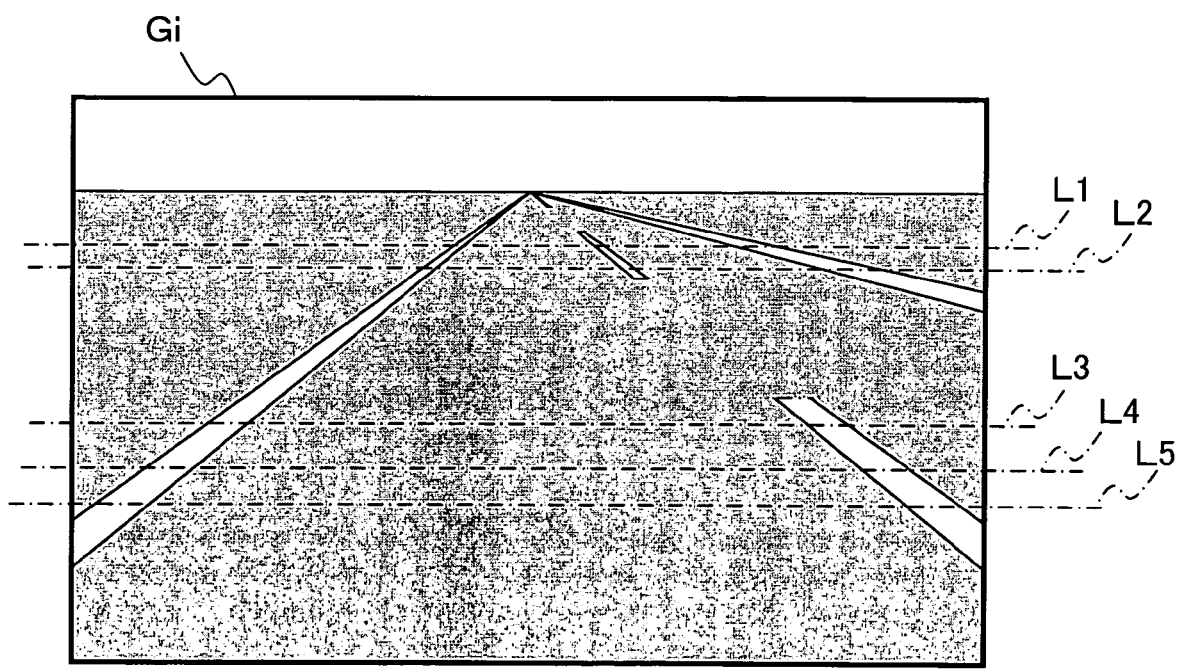
FIG. 20 is an explanatory view showing an example of an image picked up or sensed by the imaging apparatus according to the fifth embodiment of the present invention.

Hereinafter, detailed reference will be made to the processing operation of the fifth embodiment of the present invention shown in FIG. 19 while referring to FIGS. 20 through 22. FIG. 20 is an explanatory view that illustrates one example of a video image Gi sensed or picked up by the imaging apparatus 100D according to the fifth embodiment of the present invention together with a plurality of scan lines L1-L5. FIGS. 21A through 21E are explanatory views that illustrate respective video signals 701-705 at the positions of the respective scan lines L1-L5 in FIG. 20. FIG. 22 is a block diagram that illustrates a constructional example of the CF selection part 700 in FIG. 19.

In FIG. 22, the CF selection part 700 includes a counter 706 that counts the position of scanning in response to a vertical synchronization signal SV and a horizontal synchronization signal SH, a table 707 that stores high-pass cut-off frequency values corresponding to scan lines Lj, respectively, a reference part 708 that looks up the table 707 based on the count value of the counter 706, and a CF setting part 709 that sets the high-pass cut-off frequency to a reference value.

The imaging apparatus 100D illustrated in FIG. 19 takes picture of the video image Gi containing the white lines on the road surface, as shown in FIG. 20, and acquires the video signals 701-705 on the scan lines L1-L5, respectively, as shown in FIGS. 21A-21E. It can be seen that the spatial frequency fW of each white line on the road surface varies according to the position of scanning, as shown in FIGS. 21A-21E.

Figure 21A:
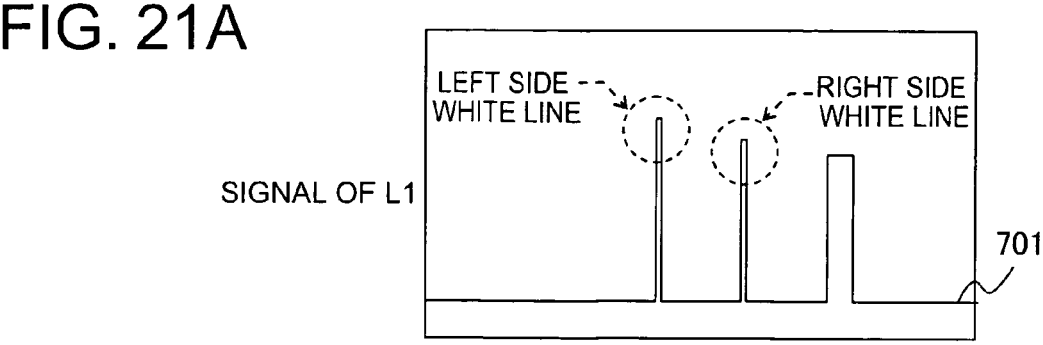
FIGS. 21A through 21E are explanatory views showing video signals of the imaging apparatus at respective scanning positions thereof according to the fifth embodiment of the present invention.
Figure 21B:
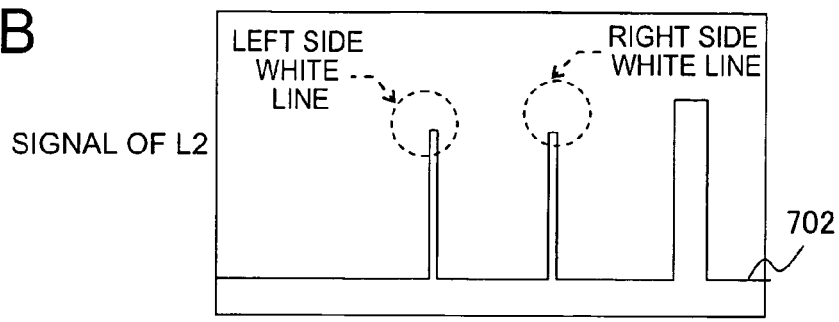
Figure 21C:
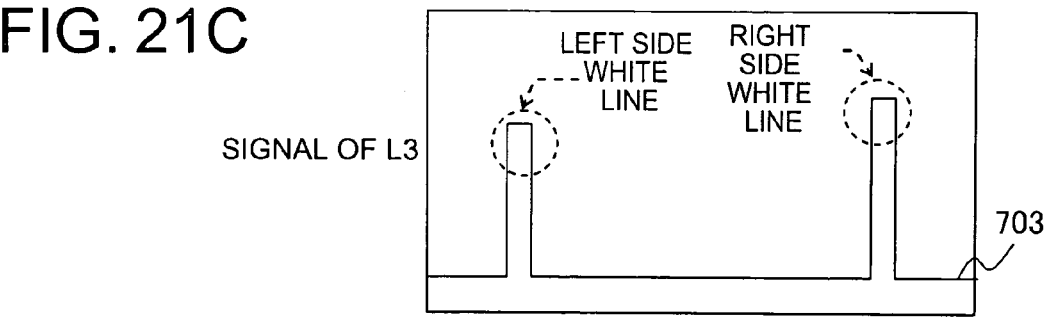
Figure 21D:
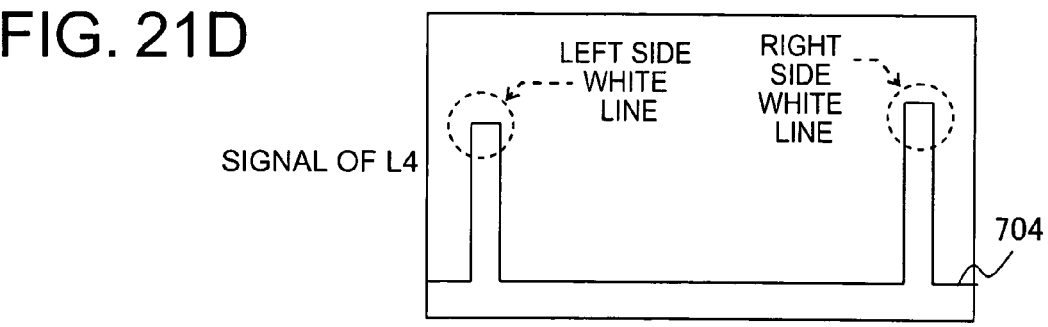
Figure 21E:
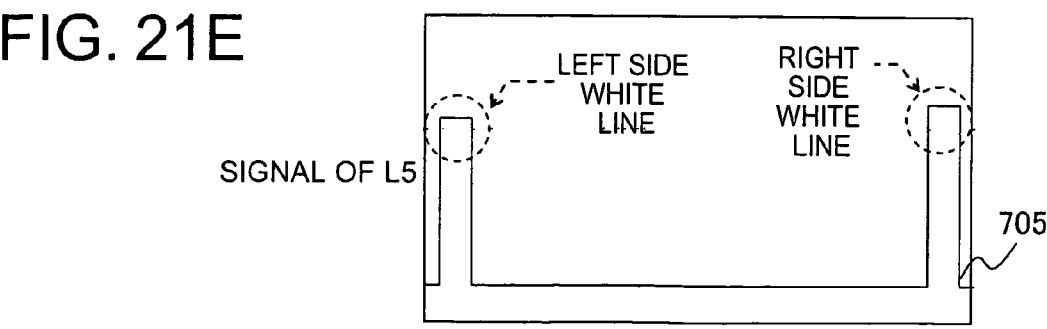
Figure 22:
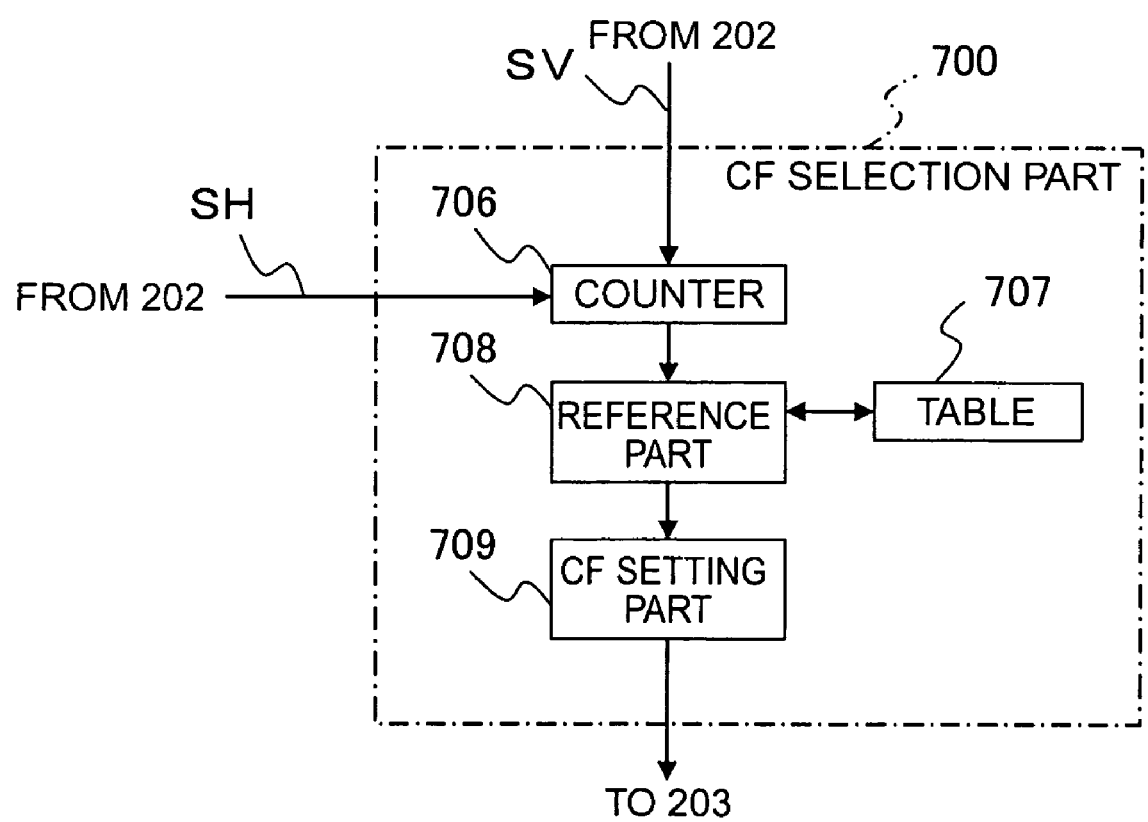
FIG. 22 is a block diagram showing the construction of a cut-off frequency selection part according to the fifth embodiment of the present invention.

Here, let us assume that in FIGS. 21A-21E, the high-pass cut-off frequency CfH of the high frequency emphasis part 203 is set, for instance, based on the spatial frequency fW (relatively low frequency) corresponding to the width of each white line in the video signal 705 on the scan line L5 (see FIG. 21E). In this case, with respect to the video signal 701 on the scan line L1 (see FIG. 21A), the spatial frequency fW corresponding to the width of each white line on the road surface becomes higher than the high-pass cut-off frequency CfH, so that components (including noise) other than the white lines on the road surface are emphasized together with the white lines, and there is a possibility that the low frequency component cannot be suppressed to a satisfactory extent. On the contrary, in case where the high-pass cut-off frequency CfH is set in accordance with the spatial frequency fW (relatively high frequency) corresponding to the width of each white line in the video signal 701 on the scan line L1, the spatial frequency fW corresponding to the width of each white line on the road surface in the video signal 705 on the scan line L5 becomes lower than the high-pass cut-off frequency CfH, so there is a possibility that the video signal for the white lines is suppressed, too.

Accordingly, in the fifth embodiment of the present invention, the CF selection part 700 changes the high-pass cut-off frequency CfH applied by the high frequency emphasis part 203 in accordance with each scanning position so as to emphasize the white lines on each scan line Lj in an appropriate manner. That is, the CF selection part 700 is constructed in such a manner that the high-pass cut-off frequency CfH can be changed in accordance with the horizontal synchronization signal SH and the vertical synchronization signal SV, as shown in FIG. 22. In FIG. 22, the counter 706 resets the scanning position in response to the vertical synchronization signal SV from the analog signal processing part 202, and counts up the scanning position each time the horizontal synchronization signal SH is input thereto. The reference part 708 looks up or makes reference to a high-pass cut-off frequency value in the table 707 based on the count value of the counter 706 (scanning position), and the CF setting part 709 outputs the high-pass cut-off frequency value thus looked up to the high frequency emphasis part 203 as a final set value.

Thus, by the provision of the CF selection part 700, it is possible to set an appropriate high-pass cut-off frequency CfH at each scanning position on each scan line Lj. As a result, the white lines can be emphasized in an effective manner.

Here, note that although the embodiment illustrated in FIG. 19 has been described as a modification of the above-mentioned second embodiment (see FIG. 9), it is needless to say that this fifth embodiment may be applied to the other first, third and fourth embodiments (see FIG. 1, FIG. 13 and FIG. 16) while providing similar operational effects.

Embodiment 6

Figure 23:
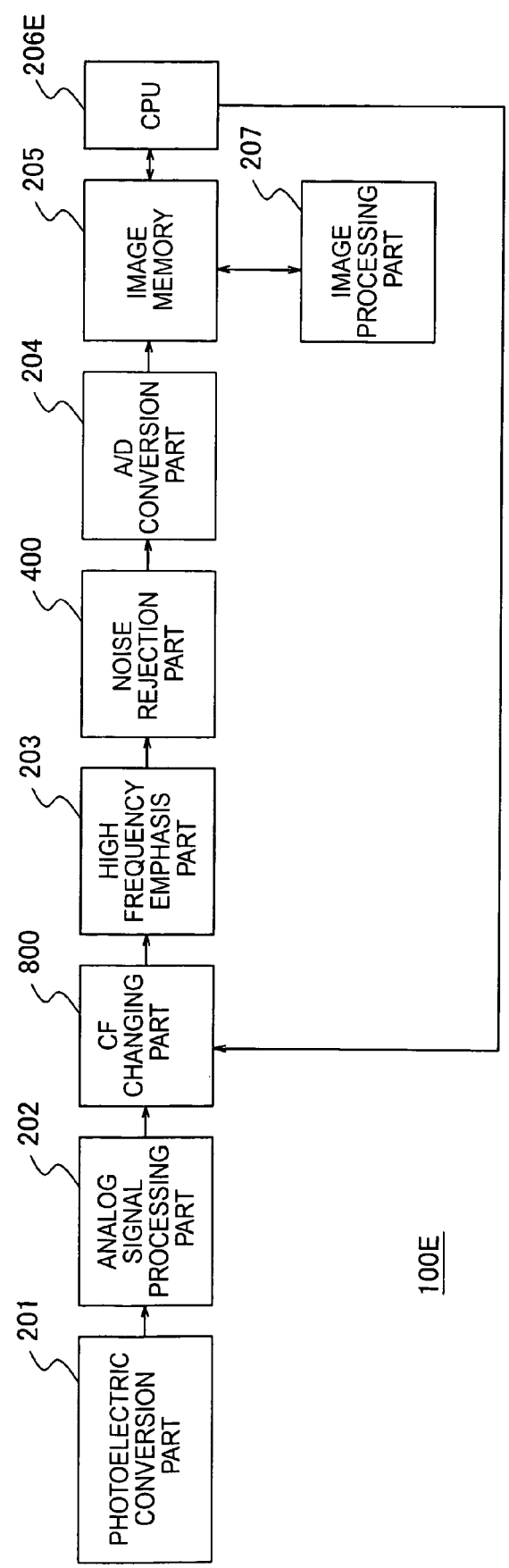
FIG. 23 is a block diagram showing the schematic construction of an imaging apparatus according to a sixth embodiment of the present invention.

Although in the above-mentioned fifth embodiment, the high-pass cut-off frequency CfH is selected in accordance with the position of each scan line, provision can be made for a CF changing part 800 for changing the high-pass cut-off frequency CfH by using a feedback loop for the result of image processing, as shown in FIG. 23.

FIG. 23 is a block diagram that illustrates the schematic construction of an imaging apparatus 100E according to a sixth embodiment of the present invention, wherein the parts or components same as those described above (see FIG. 19) are identified by the same symbols or by the same symbols with "E" affixed to their ends, while omitting a detailed explanation thereof.

In FIG. 23, the CF changing part 800 is arranged at the preceding stage of the high frequency emphasis part 203, and serves as a high-pass cut-off frequency changing section to change the high-pass cut-off frequency CfH in accordance with the result of the image processing of the CPU 206E.

In this case, a feedback loop is formed, based on the image processing result of the CPU 206E, for the high-pass cut-off frequency CfH in the CF changing part 800 arranged at the preceding stage of the high frequency emphasis part 203. Here, note that a feedback loop from the image processing part 207 can be formed in place of the feedback loop from the CPU 206E.

In addition, the CF changing part 800 can be arranged at the following stage of the A/D conversion part 204, and such an arrangement can be applied to the above-mentioned first through fourth embodiments.

Thus, by changing the high-pass cut-off frequency CfH based on the result of the image processing of the CPU 206E (or the image processing part 207) arranged at the following stage of the imaging apparatus 100E, it is possible to set an optimal high-pass cut-off frequency CfH in accordance with the image processing result. As a consequence, an appropriate filter corresponding to the spatial frequency of an object to be sensed can be formed.

Generally, in case where the road surface on which a vehicle is traveling is sensed or picked up by the imaging apparatus 100E installed in the passenger compartment of the vehicle, the conditions of images thus sensed are always varied depending, for example, on the weather, shadows reflected on the road surface, the kind of white lines thereon, etc.

However, according to the sixth embodiment of the present invention, the cut-off frequency CfH in the high frequency emphasis part 203 can be changed based on the result of image processing so as to emphasize the white lines on the road surface in an appropriate manner even in an image state that is varied due to various kinds of conditions.

Figure 24:
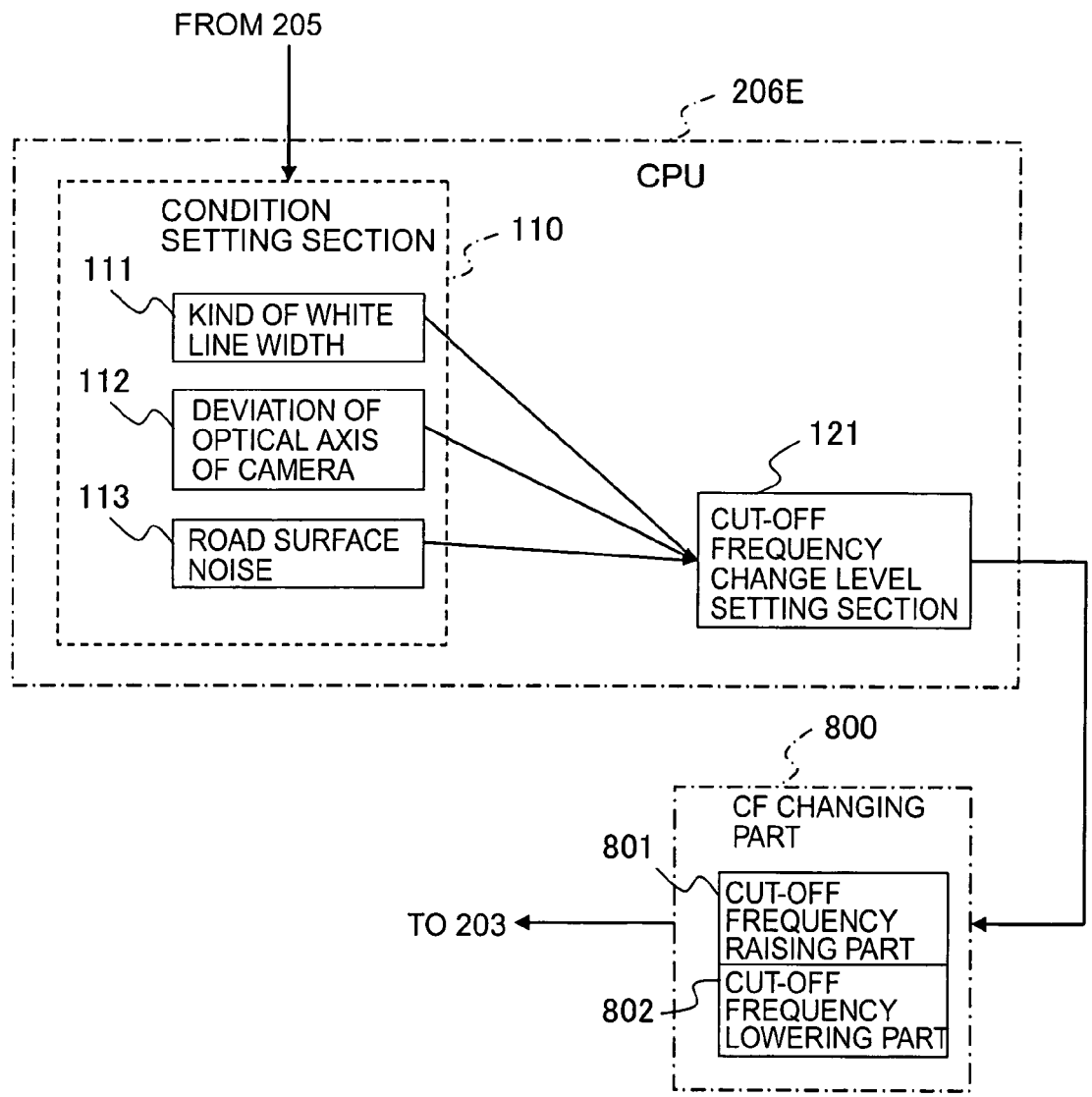
FIG. 24 is a block diagram showing the construction of a cut-off frequency changing part (i.e., a CPU and a CF changing part) according to the sixth embodiment of the present invention.

Hereinafter, detailed reference will be made to the processing operation of the sixth embodiment of the present invention shown in FIG. 23 while referring to FIG. 24. FIG. 24 is a block diagram that illustrates a constructional example of the CPU 206E and the CF changing part 800 according to the sixth embodiment of the present invention.

In FIG. 24, the CPU 206E includes a condition selection section 110 and a cut-off frequency change level setting section 121. Also, the CF changing part 800 includes a cut-off frequency up part 801 and a cut-off frequency down part 802. The condition selection section 110 inputs the kind 111 of each white line width, a camera optical axis deviation 112 and road surface noise 113 to the cut-off frequency change level setting section 121 as setting conditions based on the image data in the image memory 205. The cut-off frequency change level setting section 121 determines, based on the setting conditions 111-113 from the condition selection section 110, the direction of change of the high-pass cut-off frequency CfH (i.e., whether to change it to a high frequency side or to a high frequency side) as well as the width of change of the high-pass cut-off frequency CfH. The cut-off frequency change level setting section 121 beforehand sets, for example, a cut-off frequency corresponding to a relatively wide white line, makes reference to the kind 111 of the width of each white line after detection thereof, and determines whether the white line width is wider than or narrower than or equal to a predetermined width set beforehand.

When it is determined that the white line width based on the kind 111 of the white line width is narrower than the predetermined width, the cut-off frequency change level setting section 121 feeds back a change signal to the cut-off frequency up part 801 in the CF changing part 800 so as to provide an instruction for changing the high-pass cut-off frequency CfH in an up direction (i.e., changing to a high frequency side). As a result, the high frequency emphasis part 203 processes a video signal subsequently input by the use of the high-pass cut-off frequency CfH thus changed up.

On the other hand, when it is determined that the white line width based on the kind 111 of the white line width is equal to the predetermined width, the cut-off frequency change level setting section 121 does not provide any feedback instruction to the CF changing part 800. Accordingly, the high-pass cut-off frequency CfH is not changed, so that a subsequently input video signal is processed by means of the same high-pass cut-off frequency CfH as the last one.

Further, when no white line can be detected or when it is determined that the white line width based on the kind 111 of a white line width after detection thereof is wider than the predetermined width, the cut-off frequency change level setting section 121 feeds back a change signal to the cut-off frequency down part 802 in the CF changing part 800 so as to provide an instruction for changing the high-pass cut-off frequency CfH in a down direction (i.e., changing to a high frequency side). As a result, the high frequency emphasis part 203 processes a subsequently input video signal by the use of the high-pass cut-off frequency CfH thus changed down.

The feedback from the cut-off frequency change level setting section 121 to the CF changing part 800, i.e., the instruction to change the high-pass cut-off frequency CfH in the up or down direction, is continuously executed until the cut-off frequency CfH becomes a proper frequency corresponding to the width of a white line after detection thereof.

Similar to the case of the kind 111 of the white line width, with respect to the camera optical axis deviation 112, the cut-off frequency change level setting section 121 determines whether the optical axis of a camera deviates from its normal position after detection of a white line. If it is determined that the camera optical axis deviates from its normal position, there is a high possibility that the width of the white line after detection thereof is different from the predetermined width, so the high-pass cut-off frequency CfH is adjusted by the same change mechanism as stated above.

Similarly, with respect to the road surface noise 113, the cut-off frequency change level setting section 121 determines the presence or absence of detection of a road surface pattern other than the white line after detection thereof, and adjusts the high-pass cut-off frequency CfH in such a manner that only white lines can be detected. Thereafter, the high-pass cut-off frequency CfH adjusted by the CF changing part 800 is used in the high frequency emphasis part 203 so as to emphasize white lines.

Although with reference to FIG. 23, this sixth embodiment has been described as an example applied to the above-mentioned second embodiment, it can be applied to the other first and third through fifth embodiments without any problem. For instance, if applied to the fifth embodiment (see FIG. 19), a feedback of the result of image processing at each scanning position will be carried out.

As described above, according to the sixth embodiment of the present invention, the contrast of white lines can be improved in the imaging apparatus 100E of a wide dynamic range without the need of a large-scale circuit and high cost. In this case, too, the CPU 206E or the image processing part 207 can accurately recognize the white lines on the road surface from the forward, rear or side road images taken from the vehicle, and perform excellent image processing by emphasizing the white lines of low contrast on the road surface. Moreover, by setting the high-pass cut-off frequency CfH to a value between the spatial frequency fP of the road surface and the spatial frequency fw of the white lines, as stated above, the white lines of low contrast on the road surface can be emphasized in a reliable manner.

In the above-mentioned first through sixth embodiments, reference has been made to the case where each of the imaging apparatuses 100, 100A-100E is installed on a vehicle (see FIG. 2), and each of the CPUs 206, 206E or the image processing part 207 includes a white line recognition section for recognizing white lines on a road surface on which the vehicle is traveling, based on the results of a forward, rear or side view taken from the vehicle, and the high-pass cut-off frequency CfH of the high frequency emphasis part is set to a frequency between the spatial frequency fP of the road surface and the spatial frequency fW of the white lines, but it is needless to say that the imaging apparatuses 100, 100A-100E can be applied to other uses while achieving similar operational effects.

While the invention has been described in terms of preferred embodiments, those skilled in the art will recognize that the invention can be practiced with modifications within the spirit and scope of the appended claims.

What is claimed is:

1. An imaging apparatus having a nonlinear input-output characteristic, and capable of sensing a light and dark difference that is wider than an imaging device having a single linear input-output characteristic over an entire image pick-up range can do, said apparatus comprising:
   a light receiving element that receives incident light from an object to be sensed and generates a light reception signal;
   a photoelectric conversion part that converts the light reception signal of said light receiving element into an analog video signal of a voltage corresponding to an amount of light of said incident light;
   an analog signal processing part that processes said analog video signal to create a signal component;
   an A/D conversion part that converts said signal component into a digital video signal;
   a high-pass filter that emphasizes a high frequency component of said analog video signal or said digital video signal; and
   a high-pass cut-off frequency selection section that selects said high-pass cut-off frequency in accordance with the position of each scan line for said analog video signal or said digital video signal.

2. The imaging apparatus as set forth in claim 1, wherein said high-pass filter comprises an analog high-pass filter that is disposed at the preceding stage of said A/D conversion part.

3. The imaging apparatus as set forth in claim 1, wherein said high-pass filter comprises a digital high-pass filter that is disposed at the following stage of said A/D conversion part.

4. The imaging apparatus as set forth in claim 1, further comprising a low-pass filter that removes noise of a high frequency component contained in said analog video signal or said digital video signal, wherein said low-pass filter has a low-pass cut-off frequency that is set to a frequency higher than a high-pass cut-off frequency of said high-pass filter.

5. The imaging apparatus as set forth in claim 4, wherein said high-pass filter and said low-pass filter together constitute a band-pass filter.

6. The imaging apparatus as set forth in claim 1, further comprising:
   an image memory that stores, as image data, said digital video signal that has passed through said A/D conversion part and said high-pass filter;
   an image processing part that processes said image data; and
   a high-pass cut-off frequency changing section that changes said high-pass cut-off frequency based on the result of image processing of said image processing part.

7. The imaging apparatus as set forth in claim 6, wherein said imaging processing part includes a boundary line recognition section that is installed on a vehicle for recognizing boundary lines on a road surface on which said vehicle is traveling, based on the result of a forward, rear or side view taken from said vehicle.

8. The imaging apparatus as set forth in claim 7, wherein said high-pass cut-off frequency is set to a frequency between a spatial frequency of said road surface and a spatial frequency of each of said boundary lines.

9. An imaging apparatus having a nonlinear input-output characteristic, and capable of sensing a light and dark difference that is wider than an imaging device having a single linear input-output characteristic over an entire image pick-up range can do, said apparatus comprising:
   a light receiving element that receives incident light from an object to be sensed and generates a light reception signal;
   a photoelectric conversion part that converts the light reception signal of said light receiving element into an analog video signal of a voltage corresponding to an amount of light of said incident light;
   an analog signal processing part that processes said analog video signal to create a signal component;
   an A/D conversion part that converts said signal component into a digital video signal;
   a high-pass filter that emphasizes a high frequency component of said analog video signal or said digital video signal;

a high-pass cut-off frequency selection section that selects said high-pass cut-off frequency in accordance with the position of each scan line for said analog video signal or said digital video signal;
an image memory that stores, as image data, said digital video signal that has passed through said A/D conversion part and said high-pass filter;
an image processing part that processes said image data;
a high-pass cut-off frequency changing section that changes said high-pass cut-off frequency based on the result of image processing of said image processing part;
wherein said imaging processing part includes a boundary line recognition section that is installed on a vehicle for recognizing boundary lines on a road surface on which said vehicle is traveling, based on the result of a forward, rear or side view taken from said vehicle; and
wherein said high-pass cut-off frequency is set to a frequency between a spatial frequency of said road surface and a spatial frequency of each of said boundary lines.

* * * * *